United States Patent
Myers et al.

(10) Patent No.: US 11,881,223 B2
(45) Date of Patent: *Jan. 23, 2024

(54) SYSTEMS AND METHODS OF OPERATING MEDIA PLAYBACK SYSTEMS HAVING MULTIPLE VOICE ASSISTANT SERVICES

(71) Applicant: Sonos, Inc., Santa Barbara, CA (US)

(72) Inventors: Ryan Richard Myers, Santa Barbara, CA (US); Luis R. Vega Zayas, Santa Barbara, CA (US); Sangah Park, Somerville, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,579

(22) Filed: Dec. 5, 2022

(65) Prior Publication Data

US 2023/0215433 A1    Jul. 6, 2023

Related U.S. Application Data

(63) Continuation of application No. 17/454,676, filed on Nov. 12, 2021, now Pat. No. 11,557,294, which is a
(Continued)

(51) Int. Cl.
*G10L 15/22* (2006.01)
*G06F 3/16* (2006.01)
*G10L 15/08* (2006.01)

(52) U.S. Cl.
CPC .............. *G10L 15/22* (2013.01); *G06F 3/165* (2013.01); *G10L 15/08* (2013.01); *G10L 2015/088* (2013.01); *G10L 2015/223* (2013.01)

(58) Field of Classification Search
CPC ... G06F 3/167; G06F 2203/0381; G06F 3/165
See application file for complete search history.

(56) References Cited

U.S. PATENT DOCUMENTS

| 999,715 A | 8/1911 | Gundersen |
|---|---|---|
| 5,717,768 A | 2/1998 | Laroche |
(Continued)

FOREIGN PATENT DOCUMENTS

| CN | 1748250 A | 3/2006 |
|---|---|---|
| CN | 1781291 A | 5/2006 |
(Continued)

OTHER PUBLICATIONS

Notice of Allowance dated Jan. 20, 2023, issued in connection with U.S. Appl. No. 16/915,234, filed Jun. 29, 2020, 6 pages.
(Continued)

*Primary Examiner* — Jakieda R Jackson
(74) *Attorney, Agent, or Firm* — Fortem IP LLP; Matt Lincicum

(57) ABSTRACT

Systems and methods for managing multiple voice assistants are disclosed. Audio input is received via one or more microphones of a playback device. A first activation word is detected in the audio input via the playback device. After detecting the first activation word, the playback device transmits a voice utterance of the audio input to a first voice assistant service (VAS). The playback device receives, from the first VAS, first content to be played back via the playback device. The playback device also receives, from a second VAS, second content to be played back via the playback device. The playback device plays back the first content while suppressing the second content. Such suppression can include delaying or canceling playback of the second content.

20 Claims, 18 Drawing Sheets

Related U.S. Application Data continuation of application No. 16/213,570, filed on Dec. 7, 2018, now Pat. No. 11,183,183.

(56) References Cited

U.S. PATENT DOCUMENTS

| | | |
|---|---|---|
| 5,857,172 A | 1/1999 | Rozak |
| 6,070,140 A | 5/2000 | Tran |
| 6,219,645 B1 | 4/2001 | Byers |
| 6,937,977 B2 | 8/2005 | Gerson |
| 7,103,542 B2 | 9/2006 | Doyle |
| 7,516,068 B1 | 4/2009 | Clark |
| 7,705,565 B2 | 4/2010 | Patino et al. |
| 8,325,909 B2 | 12/2012 | Tashev et al. |
| 8,386,523 B2 * | 2/2013 | Mody .................. G10L 19/167 711/105 |
| 8,473,618 B2 | 6/2013 | Spear et al. |
| 8,588,849 B2 * | 11/2013 | Patterson ................ H04W 4/20 709/204 |
| 8,594,320 B2 | 11/2013 | Faller |
| 8,620,232 B2 | 12/2013 | Helsloot |
| 8,639,214 B1 | 1/2014 | Fujisaki |
| 8,676,273 B1 | 3/2014 | Fujisaki |
| 8,762,156 B2 | 6/2014 | Chen |
| 8,898,063 B1 | 11/2014 | Sykes et al. |
| 9,002,024 B2 | 4/2015 | Nakadai et al. |
| 9,047,857 B1 | 6/2015 | Barton |
| 9,070,367 B1 | 6/2015 | Hoffmeister et al. |
| 9,088,336 B2 | 7/2015 | Mani et al. |
| 9,098,467 B1 | 8/2015 | Blanksteen et al. |
| 9,124,650 B2 * | 9/2015 | Maharajh ................ G06F 21/10 |
| 9,183,845 B1 | 11/2015 | Gopalakrishnan et al. |
| 9,208,785 B2 | 12/2015 | Ben-David et al. |
| 9,313,317 B1 | 4/2016 | Lebeau et al. |
| 9,354,687 B2 | 5/2016 | Bansal et al. |
| 9,368,105 B1 | 6/2016 | Freed et al. |
| 9,491,033 B1 | 11/2016 | Soyannwo et al. |
| 9,514,747 B1 | 12/2016 | Bisani et al. |
| 9,532,139 B1 | 12/2016 | Lu et al. |
| 9,542,941 B1 | 1/2017 | Weksler et al. |
| 9,558,755 B1 | 1/2017 | Laroche et al. |
| 9,632,748 B2 | 4/2017 | Faaborg et al. |
| 9,640,194 B1 | 5/2017 | Nemala et al. |
| 9,672,812 B1 | 6/2017 | Watanabe et al. |
| 9,691,384 B1 | 6/2017 | Wang et al. |
| 9,706,320 B2 | 7/2017 | Starobin et al. |
| 9,749,738 B1 | 8/2017 | Adsumilli et al. |
| 9,756,422 B2 | 9/2017 | Paquier et al. |
| 9,767,786 B2 | 9/2017 | Starobin et al. |
| 9,779,725 B2 | 10/2017 | Sun et al. |
| 9,781,532 B2 | 10/2017 | Sheen |
| 9,799,330 B2 | 10/2017 | Nemala et al. |
| 9,812,128 B2 | 11/2017 | Mixter et al. |
| 9,818,407 B1 | 11/2017 | Secker-Walker et al. |
| 9,865,264 B2 | 1/2018 | Gelfenbeyn et al. |
| 9,875,740 B1 | 1/2018 | Kumar et al. |
| 9,898,250 B1 | 2/2018 | Williams et al. |
| 9,899,021 B1 | 2/2018 | Vitaladevuni et al. |
| 9,972,343 B1 | 5/2018 | Thorson et al. |
| 9,992,642 B1 | 6/2018 | Rapp et al. |
| 10,028,069 B1 | 7/2018 | Lang |
| 10,038,419 B1 | 7/2018 | Elliot et al. |
| 10,115,400 B2 | 10/2018 | Wilberding |
| 10,116,748 B2 * | 10/2018 | Farmer ................ H04M 1/6091 |
| 10,134,398 B2 | 11/2018 | Sharifi |
| 10,134,399 B2 | 11/2018 | Lang et al. |
| 10,152,969 B2 | 12/2018 | Reilly et al. |
| 10,186,276 B1 | 1/2019 | Dewasurendra et al. |
| 10,204,624 B1 | 2/2019 | Knudson et al. |
| 10,249,205 B2 | 4/2019 | Hammersley et al. |
| 10,304,440 B1 | 5/2019 | Panchapagesan et al. |
| 10,304,475 B1 | 5/2019 | Wang et al. |
| 10,318,236 B1 | 6/2019 | Pal et al. |
| 10,332,508 B1 | 6/2019 | Hoffmeister |
| 10,354,658 B2 | 7/2019 | Wilberding |
| 10,424,296 B2 | 9/2019 | Penilla et al. |
| 10,565,999 B2 | 1/2020 | Wilberding |
| 10,565,998 B2 | 2/2020 | Wilberding |
| 10,586,534 B1 | 3/2020 | Argyropoulos et al. |
| 10,593,328 B1 | 3/2020 | Wang et al. |
| 10,593,330 B2 | 3/2020 | Sharifi |
| 10,699,711 B2 | 6/2020 | Reilly |
| 10,720,173 B2 | 7/2020 | Freeman et al. |
| 10,735,870 B2 | 8/2020 | Ballande et al. |
| 10,746,840 B1 | 8/2020 | Barton et al. |
| 10,777,203 B1 | 9/2020 | Pasko |
| 10,789,041 B2 | 9/2020 | Kim et al. |
| 10,824,682 B2 | 11/2020 | Alvares et al. |
| 10,825,471 B2 | 11/2020 | Walley et al. |
| 10,837,667 B2 | 11/2020 | Nelson et al. |
| 10,847,137 B1 | 11/2020 | Mandal et al. |
| 10,847,164 B2 | 11/2020 | Wilberding |
| 10,867,604 B2 | 12/2020 | Smith et al. |
| 10,871,943 B1 | 12/2020 | D'Amato et al. |
| 10,878,811 B2 | 12/2020 | Smith et al. |
| 10,964,314 B2 | 3/2021 | Jazi et al. |
| 11,024,311 B2 | 6/2021 | Mixter et al. |
| 11,025,569 B2 | 6/2021 | Lind et al. |
| 11,050,615 B2 | 6/2021 | Mathews et al. |
| 11,062,705 B2 | 7/2021 | Watanabe et al. |
| 11,100,923 B2 | 8/2021 | Fainberg et al. |
| 11,137,979 B2 | 10/2021 | Plagge |
| 11,138,969 B2 | 10/2021 | D'Amato |
| 11,159,878 B1 | 10/2021 | Chatlani et al. |
| 11,172,328 B2 | 11/2021 | Soto et al. |
| 11,172,329 B2 | 11/2021 | Soto et al. |
| 11,175,880 B2 | 11/2021 | Liu et al. |
| 11,184,704 B2 | 11/2021 | Jarvis et al. |
| 11,206,052 B1 | 12/2021 | Park et al. |
| 11,212,612 B2 | 12/2021 | Lang et al. |
| 11,264,019 B2 | 3/2022 | Bhattacharya et al. |
| 11,277,512 B1 | 3/2022 | Leeds et al. |
| 11,315,556 B2 | 4/2022 | Smith et al. |
| 11,354,092 B2 | 6/2022 | D'Amato et al. |
| 11,361,763 B1 | 6/2022 | Maas et al. |
| 11,373,645 B1 | 6/2022 | Mathew et al. |
| 11,411,763 B2 | 8/2022 | Mackay et al. |
| 11,445,301 B2 | 9/2022 | Park et al. |
| 11,514,898 B2 | 11/2022 | Millington |
| 11,531,520 B2 | 11/2022 | Wilberding |
| 2002/0054685 A1 | 5/2002 | Avendano et al. |
| 2002/0055950 A1 | 5/2002 | Witteman |
| 2002/0143532 A1 | 10/2002 | McLean et al. |
| 2004/0093219 A1 | 5/2004 | Shin et al. |
| 2004/0153321 A1 | 8/2004 | Chung et al. |
| 2004/0161082 A1 | 8/2004 | Brown et al. |
| 2007/0033043 A1 | 2/2007 | Hyakumoto |
| 2007/0038461 A1 | 2/2007 | Abbott et al. |
| 2007/0201639 A1 | 8/2007 | Park et al. |
| 2008/0160977 A1 | 7/2008 | Ahmaniemi et al. |
| 2008/0182518 A1 * | 7/2008 | Lo ..................... H04N 21/43632 455/41.3 |
| 2008/0192946 A1 | 8/2008 | Faller |
| 2008/0221897 A1 | 9/2008 | Cerra et al. |
| 2008/0291916 A1 | 11/2008 | Xiong et al. |
| 2009/0013255 A1 | 1/2009 | Yuschik et al. |
| 2009/0113053 A1 | 4/2009 | Van Wie et al. |
| 2009/0214048 A1 | 8/2009 | Stokes, III et al. |
| 2009/0299745 A1 | 12/2009 | Kennewick et al. |
| 2009/0323924 A1 | 12/2009 | Tashev et al. |
| 2010/0070276 A1 | 3/2010 | Wasserblat et al. |
| 2010/0088100 A1 * | 4/2010 | Lindahl ............... G10L 15/1822 704/E15.04 |
| 2010/0179806 A1 | 7/2010 | Zhang et al. |
| 2010/0260348 A1 | 10/2010 | Bhow et al. |
| 2010/0299639 A1 | 11/2010 | Ramsay et al. |
| 2010/0329472 A1 | 12/2010 | Nakadai et al. |
| 2010/0332236 A1 | 12/2010 | Tan |
| 2011/0019833 A1 | 1/2011 | Kuech et al. |
| 2011/0176687 A1 | 7/2011 | Birkenes |
| 2011/0202924 A1 * | 8/2011 | Banguero ............. G06F 9/4887 718/103 |
| 2011/0267985 A1 | 11/2011 | Wilkinson et al. |
| 2012/0009906 A1 | 1/2012 | Patterson et al. |
| 2012/0020485 A1 | 1/2012 | Msser et al. |

(56) References Cited

U.S. PATENT DOCUMENTS

| | | | |
|---|---|---|---|
| 2012/0027218 A1 | 2/2012 | Every et al. | |
| 2012/0076308 A1 | 3/2012 | Kuech et al. | |
| 2012/0078635 A1 | 3/2012 | Rothkopf et al. | |
| 2012/0086568 A1* | 4/2012 | Scott | G05B 15/02 340/501 |
| 2012/0224457 A1 | 9/2012 | Kim et al. | |
| 2012/0237047 A1 | 9/2012 | Neal et al. | |
| 2012/0245941 A1 | 9/2012 | Cheyer | |
| 2012/0265528 A1 | 10/2012 | Gruber et al. | |
| 2013/0073293 A1 | 3/2013 | Jang et al. | |
| 2013/0080146 A1 | 3/2013 | Kato et al. | |
| 2013/0080167 A1 | 3/2013 | Mozer | |
| 2013/0080171 A1 | 3/2013 | Mozer et al. | |
| 2013/0129100 A1 | 5/2013 | Sorensen | |
| 2013/0185639 A1 | 7/2013 | Lim | |
| 2013/0230184 A1 | 9/2013 | Kuech et al. | |
| 2013/0238326 A1 | 9/2013 | Kim et al. | |
| 2013/0283169 A1 | 10/2013 | Van Wie | |
| 2013/0289994 A1 | 10/2013 | Newman et al. | |
| 2013/0294611 A1 | 11/2013 | Yoo et al. | |
| 2013/0301840 A1 | 11/2013 | Yemdji et al. | |
| 2013/0322462 A1* | 12/2013 | Poulsen | H04L 7/10 370/458 |
| 2013/0322634 A1 | 12/2013 | Bennett et al. | |
| 2013/0336499 A1 | 12/2013 | Beckhardt et al. | |
| 2013/0339028 A1 | 12/2013 | Rosner et al. | |
| 2014/0006825 A1 | 1/2014 | Shenhav | |
| 2014/0056435 A1 | 2/2014 | Kjems et al. | |
| 2014/0064476 A1 | 3/2014 | Mani et al. | |
| 2014/0108010 A1 | 4/2014 | Maltseff et al. | |
| 2014/0126745 A1 | 5/2014 | Dickins et al. | |
| 2014/0159581 A1 | 6/2014 | Pruemmer et al. | |
| 2014/0161263 A1 | 6/2014 | Koishida et al. | |
| 2014/0172899 A1 | 6/2014 | Hakkani-Tur et al. | |
| 2014/0181199 A1 | 6/2014 | Kumar et al. | |
| 2014/0188476 A1 | 7/2014 | Li et al. | |
| 2014/0200881 A1 | 7/2014 | Chatlani | |
| 2014/0214429 A1 | 7/2014 | Pantel | |
| 2014/0229959 A1 | 8/2014 | Beckhardt et al. | |
| 2014/0244269 A1 | 8/2014 | Tokutake | |
| 2014/0270216 A1 | 9/2014 | Tsilfidis et al. | |
| 2014/0274203 A1 | 9/2014 | Ganong, III et al. | |
| 2014/0278343 A1 | 9/2014 | Tran | |
| 2014/0288686 A1 | 9/2014 | Sant et al. | |
| 2014/0310002 A1* | 10/2014 | Nitz | G10L 15/22 704/270.1 |
| 2014/0328490 A1 | 11/2014 | Mohammad et al. | |
| 2014/0363022 A1 | 12/2014 | Dizon et al. | |
| 2014/0364089 A1 | 12/2014 | Lienhart et al. | |
| 2014/0365225 A1 | 12/2014 | Haiut | |
| 2014/0368734 A1 | 12/2014 | Hoffert et al. | |
| 2015/0032443 A1 | 1/2015 | Karov et al. | |
| 2015/0032456 A1 | 1/2015 | Wait | |
| 2015/0039310 A1 | 2/2015 | Clark et al. | |
| 2015/0039311 A1 | 2/2015 | Clark et al. | |
| 2015/0073807 A1 | 3/2015 | Kumar | |
| 2015/0086034 A1* | 3/2015 | Lombardi | G06F 3/165 381/81 |
| 2015/0126255 A1 | 5/2015 | Yang et al. | |
| 2015/0154953 A1 | 6/2015 | Bapat et al. | |
| 2015/0221307 A1 | 8/2015 | Shah et al. | |
| 2015/0370531 A1* | 12/2015 | Faaborg | G10L 15/26 704/275 |
| 2015/0373100 A1 | 12/2015 | Kravets et al. | |
| 2015/0382128 A1 | 12/2015 | Ridihalgh et al. | |
| 2016/0027440 A1 | 1/2016 | Gelfenbeyn et al. | |
| 2016/0034448 A1 | 2/2016 | Tran | |
| 2016/0055847 A1 | 2/2016 | Dahan | |
| 2016/0066087 A1 | 3/2016 | Solbach et al. | |
| 2016/0077794 A1 | 3/2016 | Kim et al. | |
| 2016/0093281 A1 | 3/2016 | Kuo et al. | |
| 2016/0134924 A1 | 5/2016 | Bush et al. | |
| 2016/0148612 A1 | 5/2016 | Guo et al. | |
| 2016/0154089 A1* | 6/2016 | Altman | G08B 29/26 367/124 |
| 2016/0155443 A1* | 6/2016 | Khan | G06F 3/167 704/275 |
| 2016/0171976 A1 | 6/2016 | Sun et al. | |
| 2016/0212488 A1 | 7/2016 | Os et al. | |
| 2016/0241976 A1* | 8/2016 | Pearson | G11B 27/11 |
| 2016/0299737 A1 | 10/2016 | Clayton et al. | |
| 2016/0314782 A1* | 10/2016 | Klimanis | G10L 15/065 |
| 2016/0322045 A1 | 11/2016 | Hatfield et al. | |
| 2016/0379634 A1 | 12/2016 | Yamamoto et al. | |
| 2016/0379635 A1 | 12/2016 | Page | |
| 2017/0083606 A1 | 3/2017 | Mohan | |
| 2017/0084278 A1 | 3/2017 | Jung | |
| 2017/0090864 A1* | 3/2017 | Jorgovanovic | H04M 11/007 |
| 2017/0094215 A1* | 3/2017 | Western | G06F 3/165 |
| 2017/0110130 A1 | 4/2017 | Sharifi et al. | |
| 2017/0140449 A1* | 5/2017 | Kannan | G06Q 30/016 |
| 2017/0140750 A1 | 5/2017 | Wang et al. | |
| 2017/0140757 A1 | 5/2017 | Penilla et al. | |
| 2017/0140759 A1 | 5/2017 | Kumar et al. | |
| 2017/0164139 A1 | 6/2017 | Deselaers et al. | |
| 2017/0186425 A1 | 6/2017 | Dawes et al. | |
| 2017/0186427 A1 | 6/2017 | Wang et al. | |
| 2017/0242653 A1 | 8/2017 | Lang et al. | |
| 2017/0242656 A1 | 8/2017 | Plagge et al. | |
| 2017/0243587 A1 | 8/2017 | Plagge et al. | |
| 2017/0245076 A1 | 8/2017 | Kusano et al. | |
| 2017/0269900 A1 | 9/2017 | Triplett | |
| 2017/0270919 A1 | 9/2017 | Parthasarathi et al. | |
| 2017/0300289 A1 | 10/2017 | Gattis | |
| 2017/0329397 A1 | 11/2017 | Lin | |
| 2017/0357390 A1 | 12/2017 | Alonso Ruiz et al. | |
| 2017/0364371 A1 | 12/2017 | Nandi et al. | |
| 2017/0365247 A1 | 12/2017 | Ushakov | |
| 2018/0012077 A1 | 1/2018 | Laska et al. | |
| 2018/0033429 A1 | 2/2018 | Makke et al. | |
| 2018/0040324 A1 | 2/2018 | Wilberding | |
| 2018/0061396 A1 | 3/2018 | Srinivasan et al. | |
| 2018/0061409 A1 | 3/2018 | Valentine et al. | |
| 2018/0061419 A1* | 3/2018 | Melendo Casado | G10L 25/78 |
| 2018/0091913 A1 | 3/2018 | Hartung et al. | |
| 2018/0096678 A1 | 4/2018 | Zhou et al. | |
| 2018/0137857 A1 | 5/2018 | Zhou et al. | |
| 2018/0139512 A1 | 5/2018 | Moran et al. | |
| 2018/0182410 A1 | 6/2018 | Kaskari et al. | |
| 2018/0196776 A1 | 7/2018 | Hershko et al. | |
| 2018/0199130 A1 | 7/2018 | Jaffe et al. | |
| 2018/0233137 A1* | 8/2018 | Torok | G06F 3/167 |
| 2018/0233139 A1* | 8/2018 | Finkelstein | G10L 25/51 |
| 2018/0233141 A1 | 8/2018 | Solomon et al. | |
| 2018/0260680 A1 | 9/2018 | Finkelstein et al. | |
| 2018/0270573 A1 | 9/2018 | Lang et al. | |
| 2018/0277113 A1 | 9/2018 | Hartung et al. | |
| 2018/0293221 A1 | 10/2018 | Finkelstein et al. | |
| 2018/0301147 A1 | 10/2018 | Kim | |
| 2018/0314552 A1* | 11/2018 | Kim | G06F 9/485 |
| 2018/0330727 A1 | 11/2018 | Tulli | |
| 2018/0336892 A1 | 11/2018 | Kim et al. | |
| 2018/0350356 A1 | 12/2018 | Garcia | |
| 2018/0350379 A1 | 12/2018 | Wung et al. | |
| 2018/0352014 A1 | 12/2018 | Alsina et al. | |
| 2018/0352334 A1 | 12/2018 | Family et al. | |
| 2018/0358009 A1* | 12/2018 | Daley | G06F 3/167 |
| 2018/0358019 A1 | 12/2018 | Mont-Reynaud | |
| 2018/0365567 A1* | 12/2018 | Kolavennu | G06N 5/04 |
| 2019/0013019 A1* | 1/2019 | Lawrence | G10L 15/30 |
| 2019/0014592 A1* | 1/2019 | Hampel | H04W 72/20 |
| 2019/0019112 A1 | 1/2019 | Gelfenbeyn et al. | |
| 2019/0035404 A1 | 1/2019 | Gabel et al. | |
| 2019/0037173 A1 | 1/2019 | Lee | |
| 2019/0044745 A1* | 2/2019 | Knudson | H04L 12/282 |
| 2019/0066680 A1 | 2/2019 | Woo et al. | |
| 2019/0066710 A1 | 2/2019 | Bryan et al. | |
| 2019/0073999 A1 | 3/2019 | Prémont et al. | |
| 2019/0079724 A1* | 3/2019 | Feuz | G06F 3/167 |
| 2019/0104119 A1* | 4/2019 | Giorgi | H04L 63/102 |
| 2019/0108839 A1 | 4/2019 | Reilly et al. | |
| 2019/0122662 A1 | 4/2019 | Chang et al. | |

(56) References Cited

U.S. PATENT DOCUMENTS

| | | |
|---|---|---|
| 2019/0130906 A1 | 5/2019 | Kobayashi et al. |
| 2019/0156847 A1 | 5/2019 | Bryan et al. |
| 2019/0163153 A1* | 5/2019 | Price .................... G06F 3/165 |
| 2019/0172452 A1 | 6/2019 | Smith et al. |
| 2019/0172467 A1 | 6/2019 | Kim et al. |
| 2019/0172476 A1 | 6/2019 | Wung et al. |
| 2019/0186937 A1 | 6/2019 | Sharifi et al. |
| 2019/0188328 A1 | 6/2019 | Oyenan et al. |
| 2019/0189117 A1 | 6/2019 | Kumar |
| 2019/0206405 A1 | 7/2019 | Gillespie et al. |
| 2019/0206412 A1 | 7/2019 | Li et al. |
| 2019/0237089 A1 | 8/2019 | Shin |
| 2019/0251960 A1 | 8/2019 | Maker et al. |
| 2019/0259408 A1 | 8/2019 | Freeman et al. |
| 2019/0281387 A1 | 9/2019 | Woo et al. |
| 2019/0287536 A1 | 9/2019 | Sharifi et al. |
| 2019/0295555 A1 | 9/2019 | Wilberding |
| 2019/0295556 A1 | 9/2019 | Wilberding |
| 2019/0311715 A1 | 10/2019 | Pfeffinger et al. |
| 2019/0311718 A1 | 10/2019 | Huber et al. |
| 2019/0311722 A1 | 10/2019 | Caldwell |
| 2019/0318729 A1 | 10/2019 | Chao et al. |
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0371324 A1 | 12/2019 | Powell et al. |
| 2019/0371342 A1 | 12/2019 | Tukka et al. |
| 2019/0392832 A1 | 12/2019 | Mitsui et al. |
| 2020/0034492 A1* | 1/2020 | Verbeke ............... G06F 16/636 |
| 2020/0043489 A1 | 2/2020 | Bradley et al. |
| 2020/0110571 A1 | 4/2020 | Liu et al. |
| 2020/0125162 A1 | 4/2020 | D'Amato et al. |
| 2020/0135194 A1 | 4/2020 | Jeong |
| 2020/0135224 A1 | 4/2020 | Bromand et al. |
| 2020/0184980 A1 | 6/2020 | Wilberding |
| 2020/0244650 A1 | 7/2020 | Burris et al. |
| 2020/0342869 A1 | 10/2020 | Lee et al. |
| 2020/0409926 A1 | 12/2020 | Srinivasan et al. |
| 2021/0118439 A1 | 4/2021 | Schillmoeller et al. |
| 2021/0295849 A1 | 9/2021 | Van Der Ven et al. |
| 2021/0358481 A1 | 11/2021 | D'Amato et al. |
| 2022/0036882 A1 | 2/2022 | Ahn et al. |
| 2022/0050585 A1 | 2/2022 | Fettes et al. |
| 2022/0083136 A1 | 3/2022 | DeLeeuw |
| 2022/0301561 A1 | 9/2022 | Robert Jose et al. |

FOREIGN PATENT DOCUMENTS

| | | |
|---|---|---|
| CN | 101427154 A | 5/2009 |
| CN | 102999161 A | 3/2013 |
| CN | 104572009 A | 4/2015 |
| CN | 104885406 A | 9/2015 |
| CN | 104885438 A | 9/2015 |
| CN | 105162886 A | 12/2015 |
| CN | 105284168 A | 1/2016 |
| CN | 105389099 A | 3/2016 |
| CN | 105427861 A | 3/2016 |
| CN | 105453179 A | 3/2016 |
| CN | 105472191 A | 4/2016 |
| CN | 105493179 A | 4/2016 |
| CN | 105632486 A | 6/2016 |
| CN | 106030699 A | 10/2016 |
| CN | 106796784 A | 5/2017 |
| CN | 106910500 A | 6/2017 |
| CN | 107122158 A | 9/2017 |
| CN | 107465974 A | 12/2017 |
| CN | 107644313 A | 1/2018 |
| CN | 107767863 A | 3/2018 |
| CN | 107832837 A | 3/2018 |
| CN | 107919116 A | 4/2018 |
| CN | 108028047 A | 5/2018 |
| CN | 108028048 A | 5/2018 |
| CN | 108198548 A | 6/2018 |
| GB | 2501367 A | 10/2013 |
| JP | 2004109361 A | 4/2004 |
| JP | 2004163590 A | 6/2004 |
| JP | 2007235875 A | 9/2007 |
| JP | 2008217444 A | 9/2008 |
| JP | 2014510481 A | 4/2014 |
| JP | 2016009193 A | 1/2016 |
| JP | 2019109510 A | 7/2019 |
| TW | 201629950 A | 8/2016 |
| WO | 2008096414 A1 | 8/2008 |
| WO | 2015133022 A1 | 9/2015 |
| WO | 2015195216 A1 | 12/2015 |
| WO | 2016003509 A1 | 1/2016 |
| WO | 2016136062 A1 | 9/2016 |
| WO | 2018140777 A1 | 8/2018 |
| WO | 2019005772 A1 | 1/2019 |

OTHER PUBLICATIONS

Notice of Allowance dated Jun. 20, 2022, issued in connection with U.S. Appl. No. 16/947,895, filed Aug. 24, 2020, 7 pages.
Notice of Allowance dated Mar. 20, 2023, issued in connection with U.S. Appl. No. 17/562,412, filed Dec. 27, 2021, 9 pages.
Notice of Allowance dated Mar. 21, 2023, issued in connection with U.S. Appl. No. 17/353,254, filed Jun. 21, 2021, 8 pages.
Notice of Allowance dated Nov. 21, 2022, issued in connection with U.S. Appl. No. 17/454,676, filed Nov. 12, 2021, 8 pages.
Notice of Allowance dated Sep. 21, 2022, issued in connection with U.S. Appl. No. 17/128,949, filed Dec. 21, 2020, 8 pages.
Notice of Allowance dated Sep. 22, 2022, issued in connection with U.S. Appl. No. 17/163,506, filed Jan. 31, 2021, 13 pages.
Notice of Allowance dated Sep. 22, 2022, issued in connection with U.S. Appl. No. 17/248,427, filed Jan. 25, 2021, 9 pages.
Notice of Allowance dated Feb. 23, 2023, issued in connection with U.S. Appl. No. 17/532,674, filed Nov. 22, 2021, 10 pages.
Notice of Allowance dated Mar. 24, 2022, issued in connection with U.S. Appl. No. 16/378,516, filed Apr. 8, 2019, 7 pages.
Notice of Allowance dated Apr. 26, 2022, issued in connection with U.S. Appl. No. 17/896,129, filed Aug. 26, 2022, 8 pages.
Notice of Allowance dated Apr. 26, 2023, issued in connection with U.S. Appl. No. 17/658,717, filed Apr. 11, 2022, 11 pages.
Notice of Allowance dated Aug. 26, 2022, issued in connection with U.S. Appl. No. 17/145,667, filed Jan. 11, 2021, 8 pages.
Notice of Allowance dated Oct. 26, 2022, issued in connection with U.S. Appl. No. 17/486,574, filed Sep. 27, 2021, 11 pages.
Notice of Allowance dated Jun. 27, 2022, issued in connection with U.S. Appl. No. 16/812,758, filed Mar. 9, 2020, 16 pages.
Notice of Allowance dated Sep. 28, 2022, issued in connection with U.S. Appl. No. 17/444,043, filed Jul. 29, 2021, 17 pages.
Notice of Allowance dated Dec. 29, 2022, issued in connection with U.S. Appl. No. 17/327,911, filed May 24, 2021, 14 pages.
Notice of Allowance dated Jul. 29, 2022, issued in connection with U.S. Appl. No. 17/236,559, filed Apr. 21, 2021, 6 pages.
Notice of Allowance dated Mar. 29, 2023, issued in connection with U.S. Appl. No. 17/722,438, filed Apr. 18, 2022, 7 pages.
Notice of Allowance dated Mar. 3, 2022, issued in connection with U.S. Appl. No. 16/679,538, filed Nov. 11, 2019, 7 pages.
Notice of Allowance dated Jun. 30, 2023, issued in connection with U.S. Appl. No. 17/303,001, filed May 18, 2021, 8 pages.
Notice of Allowance dated Mar. 30, 2023, issued in connection with U.S. Appl. No. 17/303,066, filed May 19, 2021, 7 pages.
Notice of Allowance dated Mar. 31, 2023, issued in connection with U.S. Appl. No. 17/303,735, filed Jun. 7, 2021, 19 pages.
Notice of Allowance dated Apr. 5, 2023, issued in connection with U.S. Appl. No. 17/549,253, filed Dec. 13, 2021, 10 pages.
Notice of Allowance dated Mar. 6, 2023, issued in connection with U.S. Appl. No. 17/449,926, filed Oct. 4, 2021, 8 pages.
Notice of Allowance dated Apr. 8, 2022, issued in connection with U.S. Appl. No. 16/813,643, filed Mar. 9, 2020, 7 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.

(56) References Cited

OTHER PUBLICATIONS google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG =.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. Interspeech, TALP Research Center, Jan. 2010, 5 pages.
Wölfel et al. Multi-source far-distance microphone selection and combination for automatic transcription of lectures, Interspeech 2006—ICSLP, Jan. 2006, 5 pages.
Zhang et al. Noise Robust Speech Recognition Using Multi-Channel Based Channel Selection and Channel Weighting. The Institute of Electronics, Information and Communication Engineers, arXiv:1604.03276v1 [cs.SD] Jan. 1, 2010, 8 pages.
Non-Final Office Action dated May 26, 2022, issued in connection with U.S. Appl. No. 16/989,805, filed Aug. 10, 2020, 14 pages.
Non-Final Office Action dated Feb. 27, 2023, issued in connection with U.S. Appl. No. 17/493,430, filed Oct. 4, 2021, 17 pages.
Non-Final Office Action dated Feb. 28, 2023, issued in connection with U.S. Appl. No. 17/548,921, filed Dec. 13, 2021, 12 pages.
Non-Final Office Action dated Mar. 28, 2022, issued in connection with U.S. Appl. No. 17/222,151, filed Apr. 5, 2021, 5 pages.
Non-Final Office Action dated Jul. 3, 2023, issued in connection with U.S. Appl. No. 17/135,173, filed Dec. 28, 2020, 22 pages.
Non-Final Office Action dated Sep. 30, 2022, issued in connection with U.S. Appl. No. 17/353,254, filed Jun. 21, 2021, 22 pages.
Non-Final Office Action dated Nov. 4, 2022, issued in connection with U.S. Appl. No. 17/445,272, filed Aug. 17, 2021, 22 pages.
Non-Final Office Action dated Oct. 4, 2022, issued in connection with U.S. Appl. No. 16/915,234, filed Jun. 29, 2020, 16 pages.
Non-Final Office Action dated Apr. 5, 2023, issued in connection with U.S. Appl. No. 18/145,501, filed Dec. 22, 2022, 6 pages.
Non-Final Office Action dated Jul. 5, 2023, issued in connection with U.S. Appl. No. 18/061,579, filed Dec. 5, 2022, 11 pages.
Non-Final Office Action dated Feb. 7, 2023, issued in connection with U.S. Appl. No. 17/303,001, filed May 18, 2021, 8 pages.
Non-Final Office Action dated Jun. 7, 2023, issued in connection with U.S. Appl. No. 16/179,779, filed Nov. 2, 2018, 29 pages.
Non-Final Office Action dated Mar. 7, 2022, issued in connection with U.S. Appl. No. 16/812,758, filed Mar. 9, 2020, 18 pages.
Non-Final Office Action dated Jun. 8, 2023, issued in connection with U.S. Appl. No. 18/048,034, filed Oct. 20, 2022, 8 pages.
Non-Final Office Action dated Jun. 8, 2023, issued in connection with U.S. Appl. No. 18/061,243, filed Dec. 2, 2022, 10 pages.
Notice of Allowance dated Nov. 2, 2022, issued in connection with U.S. Appl. No. 16/989,805, filed Aug. 10, 2020, 5 pages.
Notice of Allowance dated Nov. 3, 2022, issued in connection with U.S. Appl. No. 17/448,015, filed Sep. 17, 2021, 7 pages.
Notice of Allowance dated Feb. 6, 2023, issued in connection with U.S. Appl. No. 17/077,974, filed Oct. 22, 2020, 7 pages.
Notice of Allowance dated Jan. 6, 2023, issued in connection with U.S. Appl. No. 17/896,129, filed Aug. 26, 2022, 13 pages.
Notice of Allowance dated Dec. 7, 2022, issued in connection with U.S. Appl. No. 17/315,599, filed May 10, 2021, 11 pages.
Notice of Allowance dated Feb. 8, 2023, issued in connection with U.S. Appl. No. 17/446,690, filed Sep. 1, 2021, 8 pages.
Notice of Allowance dated Jan. 9, 2023, issued in connection with U.S. Appl. No. 17/247,507, filed Dec. 14, 2020, 8 pages.
Notice of Allowance dated Jun. 9, 2023, issued in connection with U.S. Appl. No. 17/532,674, filed Nov. 22, 2021, 13 pages.
Notice of Allowance dated Mar. 9, 2023, issued in connection with U.S. Appl. No. 17/662,302, filed May 6, 2022, 7 pages.
Notice of Allowance dated Nov. 9, 2022, issued in connection with U.S. Appl. No. 17/385,542, filed Jul. 26, 2021, 8 pages.
Notice of Allowance dated Mar. 1, 2022, issued in connection with U.S. Appl. No. 16/879,549, filed May 20, 2020, 9 pages.
Notice of Allowance dated Jul. 10, 2023, issued in connection with U.S. Appl. No. 17/315,599, filed May 10, 2021, 2 pages.
Notice of Allowance dated Jun. 10, 2022, issued in connection with U.S. Appl. No. 16/879,549, filed May 20, 2020, 8 pages.
Notice of Allowance dated May 11, 2022, issued in connection with U.S. Appl. No. 17/135,123, filed Dec. 28, 2020, 8 pages.
Notice of Allowance dated May 11, 2022, issued in connection with U.S. Appl. No. 17/145,667, filed Jan. 11, 2021, 7 pages.
Notice of Allowance dated May 11, 2023, issued in connection with U.S. Appl. No. 18/061,638, filed Dec. 5, 2022, 15 pages.
Notice of Allowance dated Jul. 12, 2022, issued in connection with U.S. Appl. No. 16/907,953, filed Jun. 22, 2020, 8 pages.
Notice of Allowance dated Jul. 12, 2022, issued in connection with U.S. Appl. No. 17/391,404, filed Aug. 2, 2021, 13 pages.
Notice of Allowance dated Jul. 12, 2023, issued in connection with U.S. Appl. No. 18/151,619, filed Jan. 9, 2023, 13 pages.
Notice of Allowance dated Jun. 12, 2023, issued in connection with U.S. Appl. No. 17/453,632, filed Nov. 4, 2021, 9 pages.
Notice of Allowance dated Apr. 13, 2022, issued in connection with U.S. Appl. No. 17/236,559, filed Apr. 21, 2021, 7 pages.
Notice of Allowance dated Feb. 13, 2023, issued in connection with U.S. Appl. No. 18/045,360, filed Oct. 10, 2022, 9 pages.
Notice of Allowance dated Jul. 13, 2023, issued in connection with U.S. Appl. No. 18/145,501, filed Dec. 22, 2022, 9 pages.
Notice of Allowance dated Jun. 13, 2023, issued in connection with U.S. Appl. No. 17/249,776, filed Mar. 12, 2021, 10 pages.
Notice of Allowance dated Aug. 15, 2022, issued in connection with U.S. Appl. No. 17/101,949, filed Nov. 23, 2020, 11 pages.
Notice of Allowance dated Feb. 15, 2023, issued in connection with U.S. Appl. No. 17/659,613, filed Apr. 18, 2022, 21 pages.
Notice of Allowance dated Jun. 15, 2023, issued in connection with U.S. Appl. No. 17/305,698, filed Jul. 13, 2021, 8 pages.
Notice of Allowance dated Jun. 15, 2023, issued in connection with U.S. Appl. No. 17/305,920, filed Jul. 16, 2021, 8 pages.
Notice of Allowance dated Sep. 15, 2022, issued in connection with U.S. Appl. No. 16/736,725, filed Jan. 1, 2020, 11 pages.
Notice of Allowance dated Aug. 17, 2022, issued in connection with U.S. Appl. No. 17/135,347, filed Dec. 28, 2020, 14 pages.
Notice of Allowance dated Nov. 17, 2022, issued in connection with U.S. Appl. No. 17/486,222, filed Sep. 27, 2021, 10 pages.
Notice of Allowance dated Jul. 18, 2022, issued in connection with U.S. Appl. No. 17/222,151, filed Apr. 5, 2021, 5 pages.
Notice of Allowance dated Dec. 20, 2022, issued in connection with U.S. Appl. No. 16/806,747, filed Mar. 2, 2020, 5 pages.
Final Office Action dated Mar. 29, 2023, issued in connection with U.S. Appl. No. 17/549,034, filed Dec. 13, 2021, 21 pages.
Final Office Action dated Jun. 7, 2022, issued in connection with U.S. Appl. No. 16/736,725, filed Jan. 7, 2020, 14 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG =.
International Bureau, International Preliminary Report on Patentability, dated Jul. 21, 2022, issued in connection with International Application No. PCT/US2021/070007, filed on Jan. 6, 2021, 8 pages.
International Bureau, International Preliminary Report on Patentability, dated Apr. 26, 2022, issued in connection with International Application No. PCT/US2020/056632, filed on Oct. 21, 2020, 7 pages.
International Bureau, International Search Report and Written Opinion dated Mar. 20, 2023, issued in connection with International Application No. PCT/US2022/045399, filed on Sep. 30, 2022, 25 pages.
International Searching Authority, Invitation to Pay Additional Fees dated Jan. 27, 2023, issued in connection with International Application No. PCT/US2022/045399, filed on Sep. 30, 2022, 19 pages.

(56) References Cited

OTHER PUBLICATIONS

Japanese Patent Office, Decision of Refusal and Translation dated Oct. 4, 2022, issued in connection with Japanese Patent Application No. 2021-535871, 6 pages.
Japanese Patent Office, Decision of Refusal and Translation dated May 23, 2023, issued in connection with Japanese Patent Application No. 2021-163622, 13 pages.
Japanese Patent Office, Decision of Refusal and Translation dated Jul. 26, 2022, issued in connection with Japanese Patent Application No. 2020-513852, 10 pages.
Japanese Patent Office, Non-Final Office Action dated Apr. 4, 2023, issued in connection with Japanese Patent Application No. 2021-573944, 5 pages.
Japanese Patent Office, Notice of Reasons for Refusal and Translation dated Sep. 13, 2022, issued in connection with Japanese Patent Application No. 2021-163622, 12 pages.
Japanese Patent Office, Office Action and Translation dated Nov. 15, 2022, issued in connection with Japanese Patent Application No. 2021-146144, 9 pages.
Japanese Patent Office, Office Action dated Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Korean Patent Office, Korean Examination Report and Translation dated Apr. 10, 2023, issued in connection with Korean Application No. 10-2022-7024007, 8 pages.
Korean Patent Office, Korean Examination Report and Translation dated Oct. 13, 2022, issued in connection with Korean Application No. 10-2021-7030939, 4 pages.
Korean Patent Office, Korean Examination Report and Translation dated Apr. 19, 2022, issued in connection with Korean Application No. 10-2021-7008937, 14 pages.
Korean Patent Office, Korean Examination Report and Translation dated Jul. 26, 2022, issued in connection with Korean Application No. 10-2022-7016656, 17 pages.
Korean Patent Office, Korean Examination Report and Translation dated Mar. 31, 2023, issued in connection with Korean Application No. 10-2022-7016656, 7 pages.
Korean Patent Office, Korean Examination Report and Translation dated Oct. 31, 2021, issued in connection with Korean Application No. 10-2022-7024007, 10 pages.
Korean Patent Office, Office Action and Translation dated Feb. 27, 2023, issued in connection with Korean Application No. 10-2022-7021879, 5 pages.
Mathias Wolfel. Channel Selection by Class Separability Measures for Automatic Transcriptions on Distant Microphones, Interspeech 2007 10.21437/Interspeech_2007-255, 4 pages.
Non-Final Office Action dated Feb. 2, 2023, issued in connection with U.S. Appl. No. 17/305,698, filed Jul. 13, 2021, 16 pages.
Non-Final Office Action dated Dec. 5, 2022, issued in connection with U.S. Appl. No. 17/662,302, filed May 6, 2022, 12 pages.
Non-Final Office Action dated Oct. 5, 2022, issued in connection with U.S. Appl. No. 17/449,926, filed Oct. 4, 2021, 11 pages.
Non-Final Office Action dated Apr. 12, 2023, issued in connection with U.S. Appl. No. 17/878,649, filed Aug. 1, 2022, 16 pages.
Non-Final Office Action dated Nov. 14, 2022, issued in connection with U.S. Appl. No. 17/077,974, filed Oct. 22, 2020, 6 pages.
Non-Final Office Action dated Sep. 14, 2022, issued in connection with U.S. Appl. No. 17/446,690, filed Sep. 1, 2021, 10 pages.
Non-Final Office Action dated Aug. 15, 2022, issued in connection with U.S. Appl. No. 17/448,015, filed Sep. 17, 2021, 12 pages.
Non-Final Office Action dated Dec. 15, 2022, issued in connection with U.S. Appl. No. 17/549,253, filed Dec. 13, 2021, 10 pages.
Non-Final Office Action dated Feb. 15, 2023, issued in connection with U.S. Appl. No. 17/453,632, filed Nov. 4, 2021, 12 pages.
Non-Final Office Action dated Sep. 15, 2022, issued in connection with U.S. Appl. No. 17/247,507, filed Dec. 14, 2020, 9 pages.
Non-Final Office Action dated Sep. 15, 2022, issued in connection with U.S. Appl. No. 17/327,911, filed May 24, 2021, 44 pages.
Non-Final Office Action dated Feb. 16, 2023, issued in connection with U.S. Appl. No. 17/305,920, filed Jul. 16, 2021, 12 pages.
Non-Final Office Action dated Jul. 18, 2023, issued in connection with U.S. Appl. No. 18/066,093, filed Dec. 14, 2022, 12 pages.
Non-Final Office Action dated Oct. 18, 2022, issued in connection with U.S. Appl. No. 16/949,973, filed Nov. 23, 2020, 31 pages.
Non-Final Office Action dated Sep. 19, 2022, issued in connection with U.S. Appl. No. 17/385,542, filed Jul. 26, 2021, 9 pages.
Non-Final Office Action dated Apr. 20, 2023, issued in connection with U.S. Appl. No. 18/061,570, filed Dec. 5, 2022, 12 pages.
Non-Final Office Action dated Oct. 20, 2022, issued in connection with U.S. Appl. No. 17/532,674, filed Nov. 22, 2021, 52 pages.
Non-Final Office Action dated Dec. 22, 2022, issued in connection with U.S. Appl. No. 16/168,389, filed Oct. 23, 2018, 39 pages.
Non-Final Office Action dated Jun. 23, 2023, issued in connection with U.S. Appl. No. 18/048,945, filed Oct. 24, 2022, 10 pages.
Non-Final Office Action dated Mar. 23, 2022, issued in connection with U.S. Appl. No. 16/907,953, filed Jun. 22, 2020, 7 pages.
Non-Final Office Action dated Sep. 23, 2022, issued in connection with U.S. Appl. No. 16/153,530, filed Oct. 5, 2018, 25 pages.
Non-Final Office Action dated Apr. 24, 2023, issued in connection with U.S. Appl. No. 17/532,744, filed Nov. 22, 2021, 18 pages.
Non-Final Office Action dated May 24, 2022, issued in connection with U.S. Appl. No. 17/101,949, filed Nov. 23, 2020, 10 pages.
Non-Final Office Action dated Apr. 25, 2023, issued in connection with U.S. Appl. No. 17/536,572, filed Nov. 29, 2021, 8 pages.
Non-Final Office Action dated Apr. 25, 2023, issued in connection with U.S. Appl. No. 17/656,794, filed Mar. 28, 2022, 22 pages.
Non-Final Office Action dated May 25, 2023, issued in connection with U.S. Appl. No. 18/157,937, filed Jan. 23, 2023, 9 pages.
Non-Final Office Action dated Oct. 25, 2022, issued in connection with U.S. Appl. No. 17/549,034, filed Dec. 13, 2021, 20 pages.
Advisory Action dated Nov. 7, 2022, issued in connection with U.S. Appl. No. 16/168,389, filed Oct. 23, 2018, 4 pages.
Advisory Action dated Feb. 28, 2022, issued in connection with U.S. Appl. No. 16/813,643, filed Mar. 9, 2020, 3 pages.
Australian Patent Office, Australian Examination Report Action dated Nov. 10, 2022, issued in connection with Australian Application No. 2018312989, 2 pages.
Australian Patent Office, Australian Examination Report Action dated Jul. 11, 2023, issued in connection with Australian Application No. 2022246446, 2 pages.
Australian Patent Office, Australian Examination Report Action dated Jun. 14, 2023, issued in connection with Australian Application No. 2019299865, 2 pages.
Australian Patent Office, Australian Examination Report Action dated May 19, 2022, issued in connection with Australian Application No. 2021212112, 2 pages.
Australian Patent Office, Australian Examination Report Action dated Sep. 28, 2022, issued in connection with Australian Application No. 2018338812, 3 pages.
Australian Patent Office, Australian Examination Report Action dated Mar. 4, 2022, issued in connection with Australian Application No. 2021202786, 2 pages.
Canadian Patent Office, Canadian Examination Report dated Oct. 13, 2022, issued in connection with Canadian Application No. 3121516, 4 pages.
Canadian Patent Office, Canadian Examination Report dated Sep. 14, 2022, issued in connection with Canadian Application No. 3067776, 4 pages.
Canadian Patent Office, Canadian Examination Report dated Oct. 19, 2022, issued in connection with Canadian Application No. 3123601, 5 pages.
Canadian Patent Office, Canadian Examination Report dated Mar. 29, 2022, issued in connection with Canadian Application No. 3111322, 3 pages.
Canadian Patent Office, Canadian Examination Report dated Jun. 7, 2022, issued in connection with Canadian Application No. 3105494, 5 pages.

(56) References Cited

OTHER PUBLICATIONS

Chinese Patent Office, First Office Action and Translation dated Jun. 1, 2021, issued in connection with Chinese Application No. 201980089721.5, 21 pages.
Chinese Patent Office, First Office Action and Translation dated Feb. 9, 2023, issued in connection with Chinese Application No. 201880076788.0, 13 pages.
Chinese Patent Office, First Office Action and Translation dated Oct. 9, 2022, issued in connection with Chinese Application No. 201780056695.7, 10 pages.
Chinese Patent Office, First Office Action and Translation dated Nov. 10, 2022, issued in connection with Chinese Application No. 201980070006.7, 15 pages.
Chinese Patent Office, First Office Action and Translation dated Jan. 19, 2023, issued in connection with Chinese Application No. 201880064916.X, 10 pages.
Chinese Patent Office, First Office Action and Translation dated Sep. 19, 2022, issued in connection with Chinese Application No. 201980056604.9, 13 pages.
Chinese Patent Office, First Office Action and Translation dated Nov. 25, 2022, issued in connection with Chinese Application No. 201780056321.5, 8 pages.
Chinese Patent Office, First Office Action and Translation dated Feb. 27, 2023, issued in connection with Chinese Application No. 201980003798.6, 12 pages.
Chinese Patent Office, First Office Action and Translation dated Dec. 30, 2022, issued in connection with Chinese Application No. 201880076775.3, 10 pages.
Chinese Patent Office, Second Office Action and Translation dated Mar. 3, 2022, issued in connection with Chinese Application No. 201880077216.4, 11 pages.
Chinese Patent Office, Second Office Action and Translation dated Apr. 1, 2023, issued in connection with Chinese Application No. 201980056604.9, 11 pages.
Chinese Patent Office, Second Office Action dated Dec. 21, 2022, issued in connection with Chinese Application No. 201980089721.5, 12 pages.
Chinese Patent Office, Second Office Action dated May 30, 2023, issued in connection with Chinese Application No. 201980070006.7, 9 pages.
European Patent Office, Decision to Refuse European Patent Application dated May 30, 2022, issued in connection with European Application No. 17200837.7, 4 pages.
European Patent Office, European EPC Article 94.3 dated Jun. 5, 2023, issued in connection with European Application No. 20710649.3, 8 pages.
European Patent Office, European EPC Article 94.3 dated Feb. 10, 2023, issued in connection with European Application No. 19729968.8, 7 pages.
European Patent Office, European EPC Article 94.3 dated Mar. 11, 2022, issued in connection with European Application No. 19731415.6, 7 pages.
European Patent Office, European EPC Article 94.3 dated May 2, 2022, issued in connection with European Application No. 20185599.6, 7 pages.
European Patent Office, European EPC Article 94.3 dated Jun. 21, 2022, issued in connection with European Application No. 19780508.8, 5 pages.
European Patent Office, European EPC Article 94.3 dated Feb. 23, 2023, issued in connection with European Application No. 19839734.1, 8 pages.
European Patent Office, European EPC Article 94.3 dated Nov. 28, 2022, issued in connection with European Application No. 18789515.6, 7 pages.
European Patent Office, European EPC Article 94.3 dated Mar. 3, 2022, issued in connection with European Application No. 19740292.8, 10 pages.
European Patent Office, European EPC Article 94.3 dated Jun. 30, 2022, issued in connection with European Application No. 19765953.5, 4 pages.
European Patent Office, European Extended Search Report dated Oct. 7, 2022, issued in connection with European Application No. 22182193.7, 8 pages.
European Patent Office, European Extended Search Report dated Apr. 22, 2022, issued in connection with European Application No. 21195031.6, 14 pages.
European Patent Office, European Extended Search Report dated Jun. 23, 2022, issued in connection with European Application No. 22153180.9, 6 pages.
European Patent Office, European Extended Search Report dated Jun. 30, 2022, issued in connection with European Application No. 21212763.3, 9 pages.
European Patent Office, European Extended Search Report dated Jul. 8, 2022, issued in connection with European Application No. 22153523.0, 9 pages.
European Patent Office, European Search Report dated Mar. 1, 2022, issued in connection with European Application No. 21180778.9, 9 pages.
European Patent Office, European Search Report dated Oct. 4, 2022, issued in connection with European Application No. 22180226.7, 6 pages.
European Patent Office, Summons to Attend Oral Proceedings mailed on Jul. 15, 2022, issued in connection with European Application No. 17792272.1, 11 pages.
Final Office Action dated Jun. 1, 2022, issued in connection with U.S. Appl. No. 16/806,747, filed Mar. 2, 2020, 20 pages.
Final Office Action dated Aug. 17, 2022, issued in connection with U.S. Appl. No. 16/179,779, filed Nov. 2, 2018, 26 pages.
Final Office Action dated May 17, 2023, issued in connection with U.S. Appl. No. 16/168,389, filed Oct. 23, 2018, 44 pages.
Final Office Action dated Mar. 21, 2022, issued in connection with U.S. Appl. No. 16/153,530, filed Oct. 5, 2018, 23 pages.
Final Office Action dated Aug. 22, 2022, issued in connection with U.S. Appl. No. 16/168,389, filed Oct. 23, 2018, 37 pages.
Final Office Action dated Jul. 27, 2022, issued in connection with U.S. Appl. No. 16/989,350, filed Aug. 10, 2020, 15 pages.

* cited by examiner

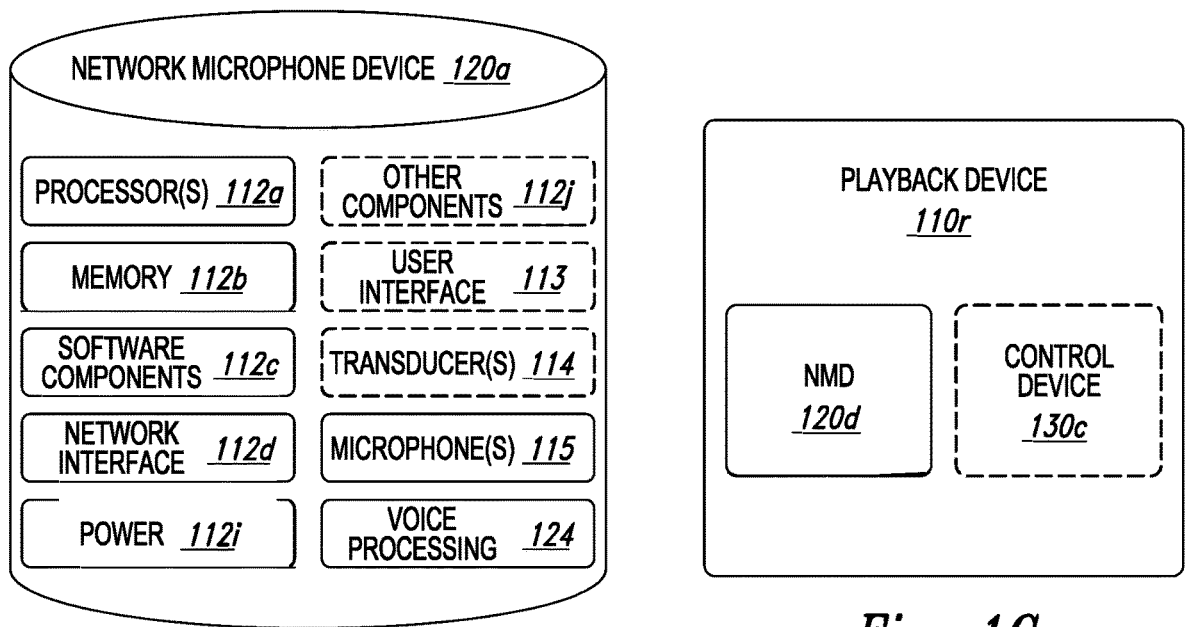
*Fig. 1F*
*Fig. 1G*
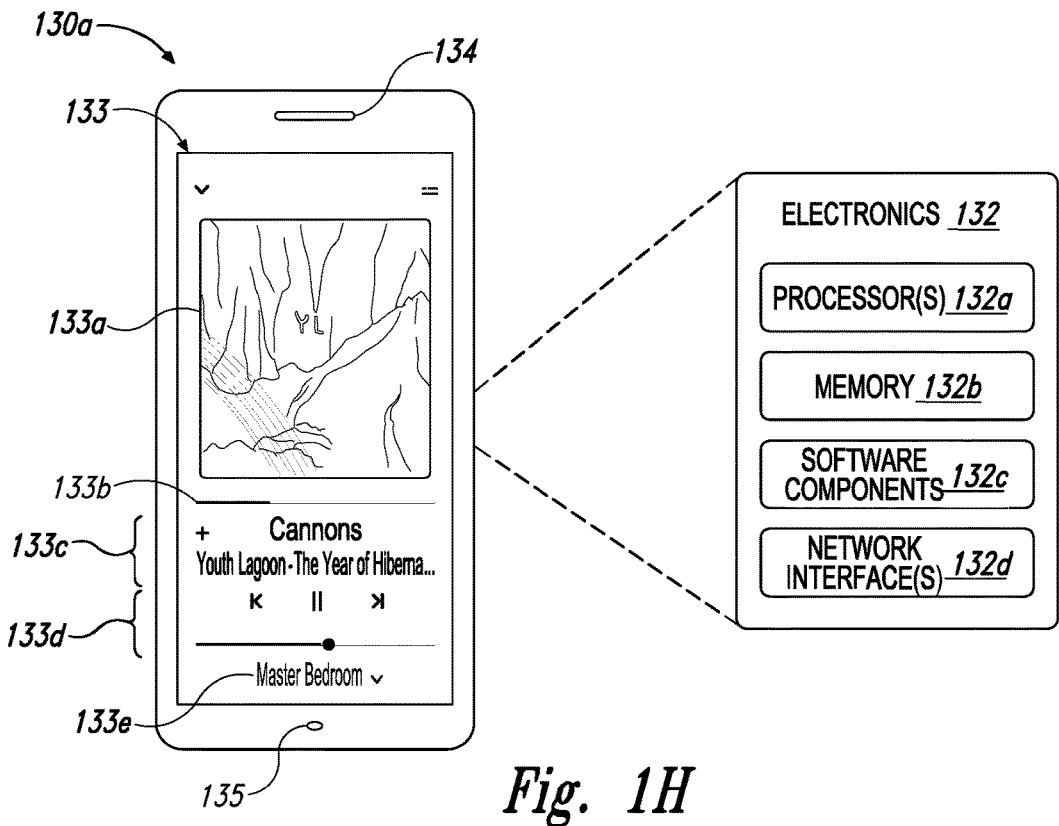
*Fig. 1H*

SYSTEMS AND METHODS OF OPERATING MEDIA PLAYBACK SYSTEMS HAVING MULTIPLE VOICE ASSISTANT SERVICES

CROSS-REFERENCE TO RELATED APPLICATION

This application is a continuation of U.S. patent application Ser. No. 17/454,676, filed Nov. 12, 2021, which is a continuation of U.S. patent application Ser. No. 16/213,570, filed Dec. 7, 2018, now U.S. Pat. No. 11,183,183, which are incorporated herein by reference in their entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

Figure 1A:
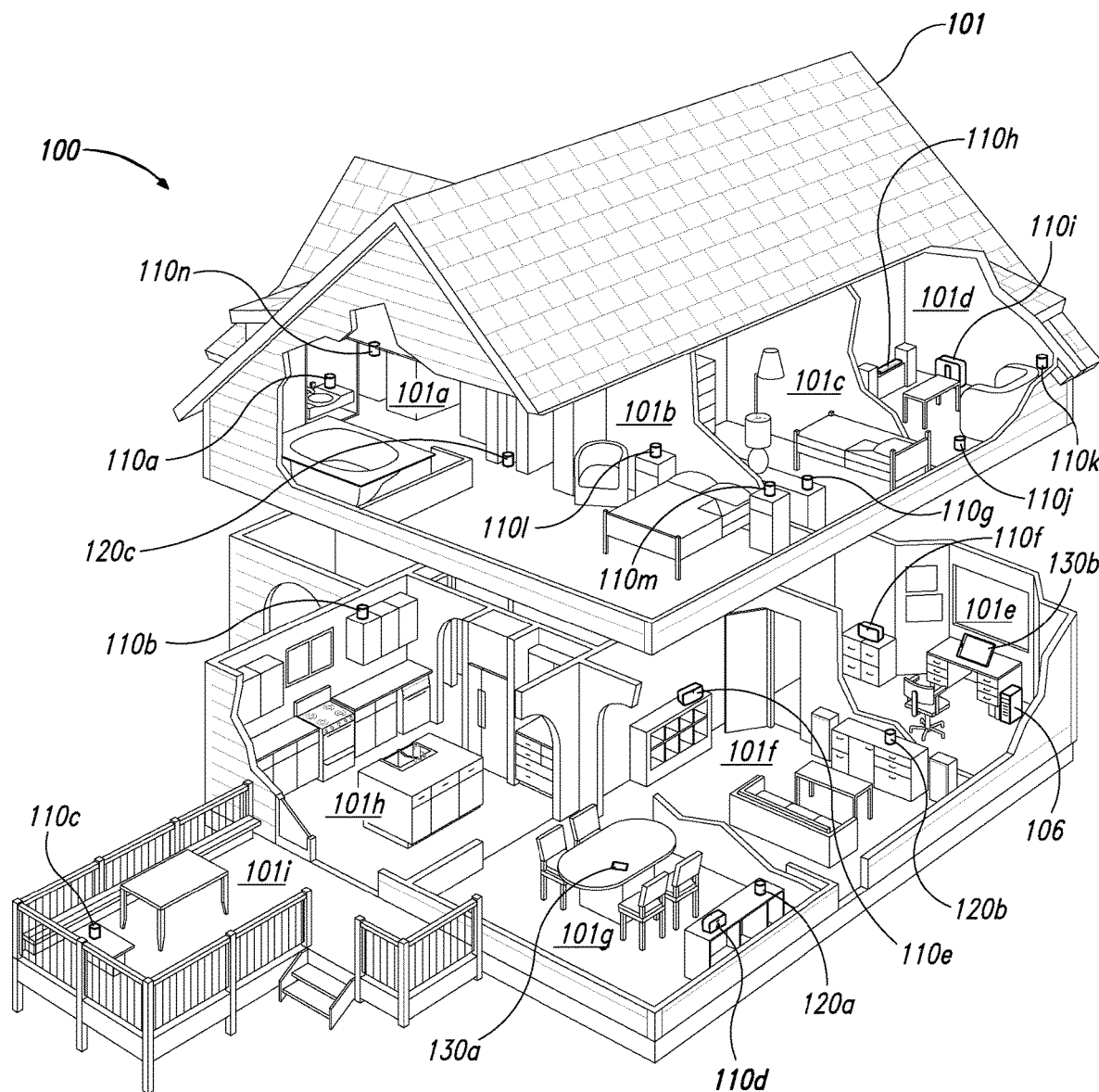
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Voice control can be beneficial for a "smart" home having smart appliances and related devices, such as wireless illumination devices, home-automation devices (e.g., thermostats, door locks, etc.), and audio playback devices. In some implementations, networked microphone devices (which may be a component of a playback device) may be used to control smart home devices. A network microphone device will typically include a microphone for receiving voice inputs. The network microphone device can forward voice inputs to a voice assistant service (VAS), such as AMAZON's ALEXA®, APPLE's SIRI®, MICROSOFT's CORTANA®, GOOGLE's Assistant, etc. A VAS may be a remote service implemented by cloud servers to process voice inputs. A VAS may process a voice input to determine an intent of the voice input. Based on the response, the network microphone device may cause one or more smart devices to perform an action. For example, the network microphone device may instruct an illumination device to turn on/off based on the response to the instruction from the VAS.

A voice input detected by a network microphone device will typically include an activation word followed by an utterance containing a user request. The activation word is typically a predetermined word or phrase used to "wake up" and invoke the VAS for interpreting the intent of the voice input. For instance, in querying AMAZON's ALEXA, a user might speak the activation word "Alexa." Other examples include "Ok, Google" for invoking GOOGLE's Assistant, and "Hey, Siri" for invoking APPLE's SIRI, or "Hey, Sonos" for a VAS offered by SONOS. In various embodiments, an activation word may also be referred to as, e.g., a wake-, trigger-, wakeup-word or phrase, and may take the form of any suitable word; combination of words, such as phrases; and/or audio cues indicating that the network microphone device and/or an associated VAS is to invoke an action.

It can be difficult to manage the association between various playback devices with two or more corresponding VASes. For example, although a user may wish to utilize multiple VASes within her home, a response received from one VAS may interrupt a response or other content received from a second VAS. Such interruptions can be synchronous, for example when a response from a second VAS interrupts a response from a first VAS. Additionally, such interruptions can be asynchronous, for example when a response from a second VAS interrupts a pre-scheduled event (e.g., an alarm) from the first VAS.

The systems and methods detailed herein address the above-mentioned challenges of managing associations between one or more playback devices and two or more VASes. In particular, systems and methods are provided for managing the communications and output between a playback device and two or more VASes to enhance the user experience. Although several examples are provided below with respect to managing interactions with two VASes, in various embodiments there may be additional VASes (e.g., three, four, five, six, or more VASes).

As described in more detail below, in some instances a playback device can manage multiple VASes by arbitrating playback of content received from different VASes content. For example, a playback device can detect an activation word in audio input, and then transmit a voice utterance of the audio input to a first VAS. The first VAS may then respond with content (e.g., a text-to-speech response) to be played back via the playback device, after which the playback device may then play back the content. At any point in this process, the playback device may concurrently receive second content from a second VAS, for example a pre-scheduled alarm, a user broadcast, a text-to-speech response, or any other content. In response to receiving this second content, the playback device can dynamically determine how to handle playback. As one option, the playback device may suppress the second content from the second VAS to avoid unduly interrupting the response played back from the first VAS. Such suppression can take the form of delaying playback of the second content or canceling playback of the second content. Alternatively, the playback device may allow the second content to interrupt the first content, for example by suppressing playback of the first content while allowing the second content to be played back. In some embodiments, the playback device determines which content to play and which to suppress based on the characteristics of the respective content—for example allowing a scheduled alarm from a second VAS to interrupt a podcast from a first VAS, but suppressing a user broadcast from a second VAS during output of a text-to-speech response from a first VAS.

As described in more detail below, in some instances a playback device can manage multiple VASes by arbitrating activation-word detection associated with different VASes. For example, the playback device may selectively disable activation-word detection for a second VAS while a user is actively engaging with a first VAS. This reduces the risk of the second VAS erroneously interrupting the user's dialogue with the first VAS upon detecting its own activation word. This also preserves user privacy by eliminating the possibility of a user's voice input intended for one VAS being transmitted to a different VAS. Once the user has concluded her dialogue session with the first VAS, the playback device may re-enable activation-word detection for the second VAS. These and other rules allow playback devices to manage playback of content from multiple different VASes without compromising the user experience.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-6.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B, 1E, and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
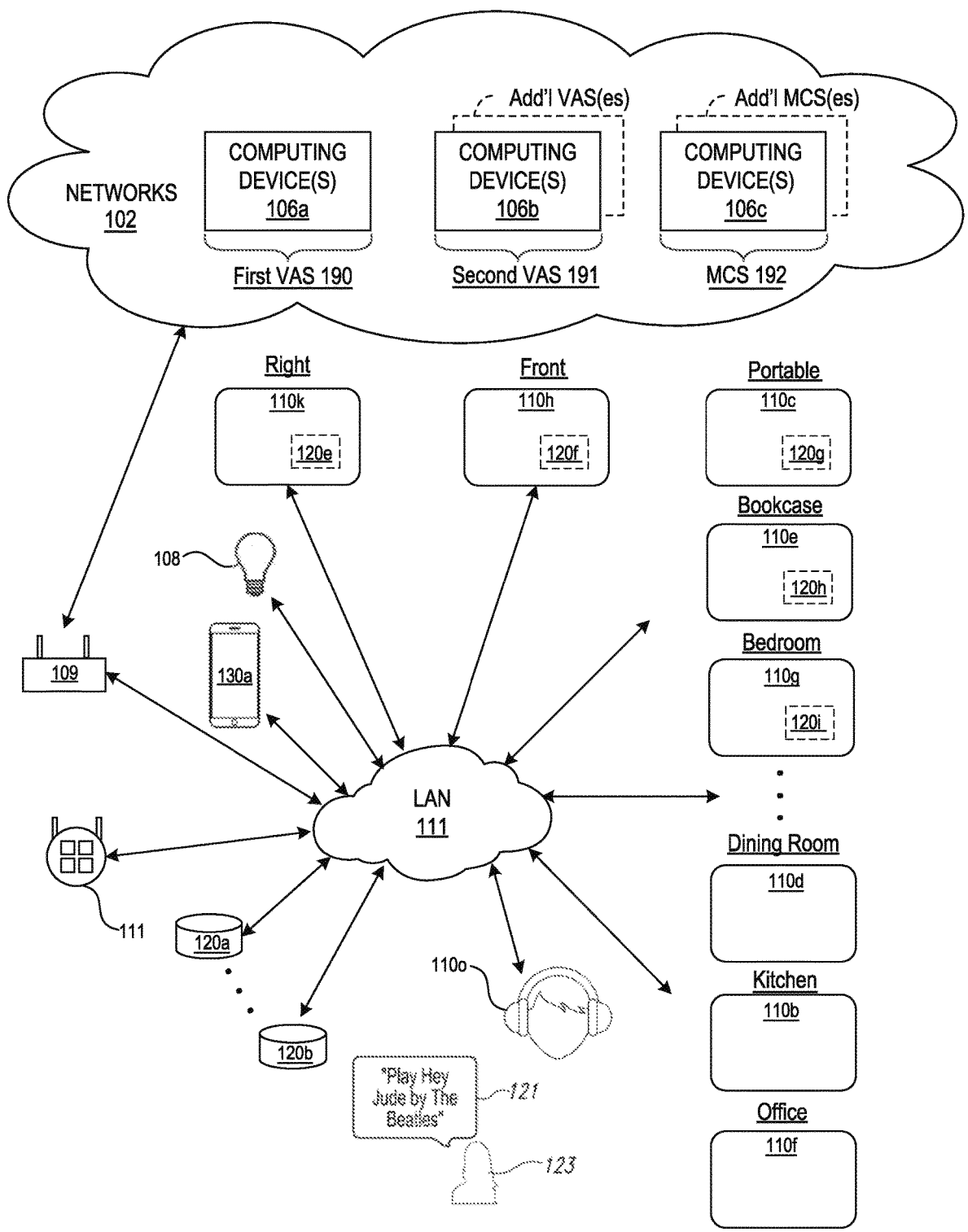
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. The various playback, network microphone, and controller devices 110, 120, 130 and/or other network devices of the MPS 100 may be coupled to one another via point-to-point connections and/or over other connections, which may be wired and/or wireless, via a LAN 111 including a network router 109. For example, the playback device 110j in the Den 101d (FIG. 1A), which may be designated as the "Left" device, may have a point-to-point connection with the playback device 110k, which is also in the Den 101d and may be designated as the "Right" device. In a related embodiment, the Left playback device 110j may communicate with other network devices, such as the playback device 110h, which may be designated as the "Front" device, via a point-to-point connection and/or other connections via the LAN 111.

In addition to the playback, network microphone, and controller devices 110, 120, and 130, the home environment 101 may include additional and/or other computing devices, including local network devices, such as one or more smart illumination devices 108 (FIG. 1B), a smart thermostat 111, and a local computing device. In embodiments described below, one or more of the various playback devices 110 may be configured as portable playback devices, while others may be configured as stationary playback devices. For example, the headphones 110o (FIG. 1B) are a portable playback device, while the playback device 110e on the bookcase may be a stationary device. As another example, the playback device 110c on the Patio may be a battery-powered device, which may allow it to be transported to various areas within the environment 101, and outside of the environment 101, when it is not plugged in to a wall outlet or the like.

As further shown in FIG. 1B, the MPS 100 may be coupled to one or more remote computing devices 106 via a wide area network ("WAN") 102. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 110, 120, 130 may be communicatively coupled to remote computing devices associated with one or more VASes and at least one remote computing device associated with a media content service ("MCS"). For instance, in the illustrated example of FIG. 1B, remote computing devices 106*a* are associated with a first VAS 190, remote computing devices 106*b* are associated with a second VAS 191, and remote computing devices 106*c* are associated with an MCS 192. Although only a two VASes 190, 191 and a single MCS 192 are shown in the example of FIG. 1B for purposes of clarity, the MPS 100 may be coupled to additional, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

The remote computing devices 106 further include remote computing devices configured to perform certain operations, such as remotely facilitating media playback functions, managing device and system status information, directing communications between the devices of the MPS 100 and one or multiple VASes and/or MCSes, among other operations. In one example, the additional remote computing devices provide cloud servers for one or more SONOS Wireless HiFi Systems.

In various implementations, one or more of the playback devices 110 may take the form of or include an on-board (e.g., integrated) network microphone device. For example, the playback devices 110*k*, 110*h*, 110*c*, 110*e*, and 110*g* include or are otherwise equipped with corresponding NMDs 120*e-i*, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMDs 120*a* and 120*b* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110*e* because it is physically situated on a bookcase. Some playback devices may be assigned names according to a zone or room, such as the playback devices 110*g*, 110*d*, 110*b*, and 110*f*, which are named "Bedroom," "Dining Room," "Kitchen," and "Office," respectively. Further, certain playback devices may have functionally descriptive names. For example, the playback devices 110*k* and 110*h* are assigned the names "Right" and "Front," respectively, because these two devices are configured to provide specific audio channels during media playback in the zone of the Den 101*d* (FIG. 1A). The playback device 110*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 120 are configured to interact with the first VAS 190 and/or the second VAS 191 over a network via the LAN 111 and the router 109. Interactions with the VASes 190 and 191 may be initiated, for example, when an NMD identifies in the detected sound a potential wake word. The identification causes a wake-word event, which in turn causes the NMD to begin transmitting detected-sound data to either the first VAS 190 or the second VAS 191, depending on the particular potential wake word identified in the detected sound. In some implementations, the various local network devices and/or remote computing devices 106 of the MPS 100 may exchange various feedback, information, instructions, and/or related data with the remote computing devices associated with the selected VAS. Such exchanges may be related to or independent of transmitted messages containing voice inputs. In some embodiments, the remote computing device (s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the first VAS 190 determines if there is voice input in the streamed data from the NMD, and if so the first VAS 190 will also determine an underlying intent in the voice input. The first VAS 190 may next transmit a response back to the MPS 100, which can include transmitting the response directly to the NMD that caused the wake-word event. The response is typically based on the intent that the first VAS 190 determined was present in the voice input. As an example, in response to the first VAS 190 receiving a voice input with an utterance to "Play Hey Jude by The Beatles," the first VAS 190 may determine that the underlying intent of the voice input is to initiate playback and further determine that intent of the voice input is to play the particular song "Hey Jude." After these determinations, the first VAS 190 may transmit a command to a particular MCS 192 to retrieve content (i.e., the song "Hey Jude"), and that MCS 192, in turn, provides (e.g., streams) this content directly to the MPS 100 or indirectly via the first VAS 190. In some implementations, the first VAS 190 may transmit to the MPS 100 a command that causes the MPS 100 itself to retrieve the content from the MCS 192. The second VAS 191 may operate similarly to the first VAS 190 when receiving a stream of sound data.

In certain implementations, NMDs may facilitate arbitration amongst one another when voice input is identified in speech detected by two or more NMDs located within proximity of one another. For example, the NMD-equipped Bookcase playback device 110e in the environment 101 (FIG. 1A) is in relatively close proximity to the NMD 120b, and both devices 110e and 120b may at least sometimes detect the same sound. In such cases, this may require arbitration as to which device is ultimately responsible for providing detected-sound data to the remote VAS. Examples of arbitrating between NMDs may be found, for example, in previously referenced U.S. patent application Ser. No. 15/438,749.

In certain implementations, an NMD may be assigned to, or otherwise associated with, a designated or default playback device that may not include an NMD. For example, the NMD 120a in the Dining Room 101g (FIG. 1A) may be assigned to the Dining Room playback device 110d, which is in relatively close proximity to the NMD 120a. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 110, 120, 130. For example, the technologies herein may be utilized within an environment having a single playback device 110 and/or a single NMD 120. In some examples of such cases, the LAN 111 (FIG. 1B) may be eliminated and the single playback device 110 and/or the single NMD 120 may communicate directly with the remote computing devices 106a-c. In some embodiments, a telecommunication network (e.g., an LTE network, a 5G network, etc.) may communicate with the various playback, network microphone, and/or controller devices 110, 120, 130 independent of a LAN.

b. Suitable Playback Devices

Figure 1C:
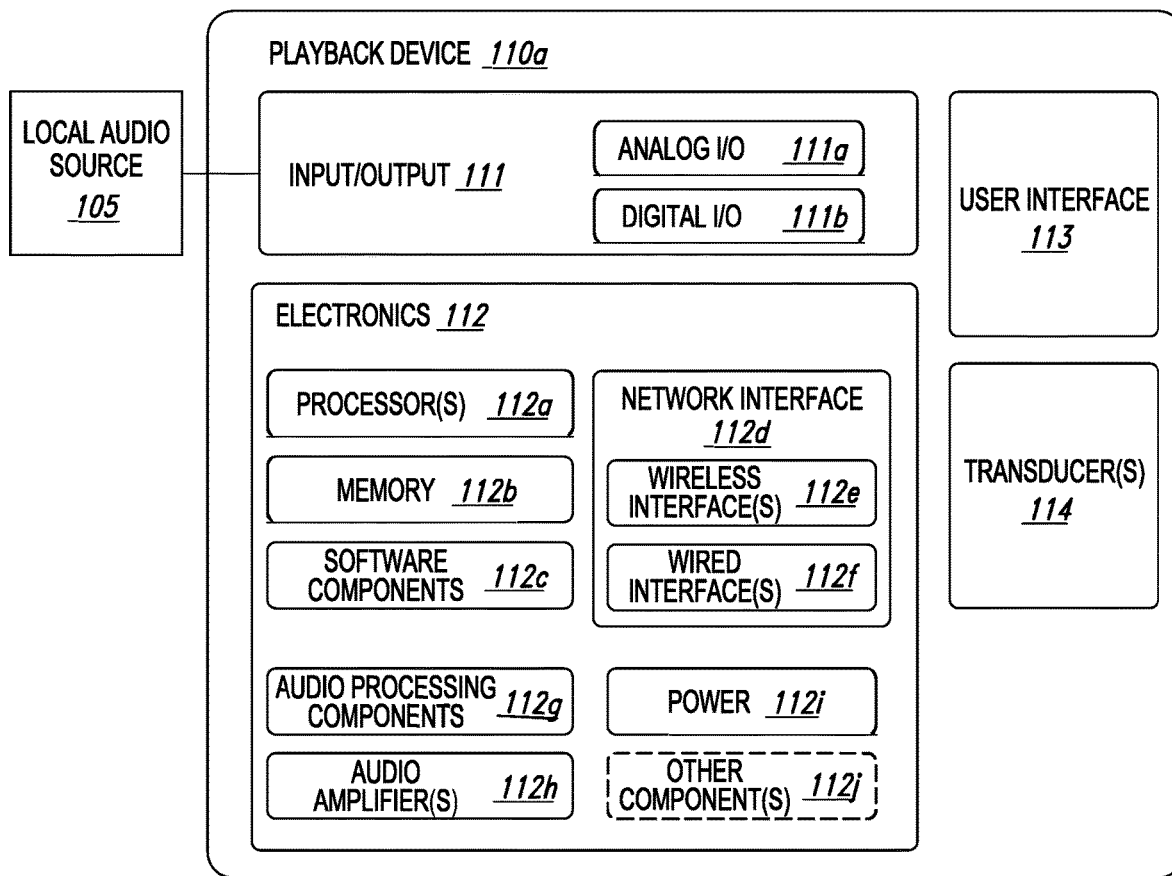
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
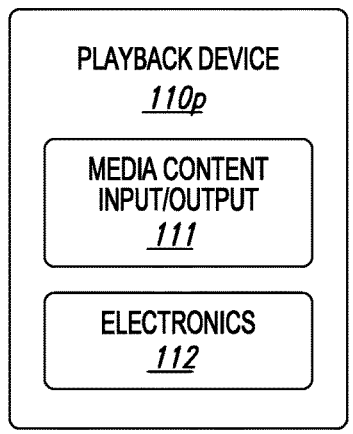
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "BEAM," "PLAYBASE," "CONNECT:AMP," "CONNECT," and "SUB." Other suitable playback devices may additionally or alternatively be used to implement the playback devices of example embodiments disclosed herein. Additionally, one of ordinary skill in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
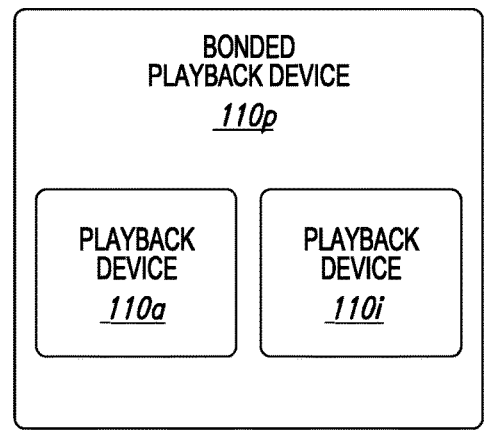
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others. Additional description of zones and groups can be found below with respect to FIGS. 1I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figures 1I, 1J:
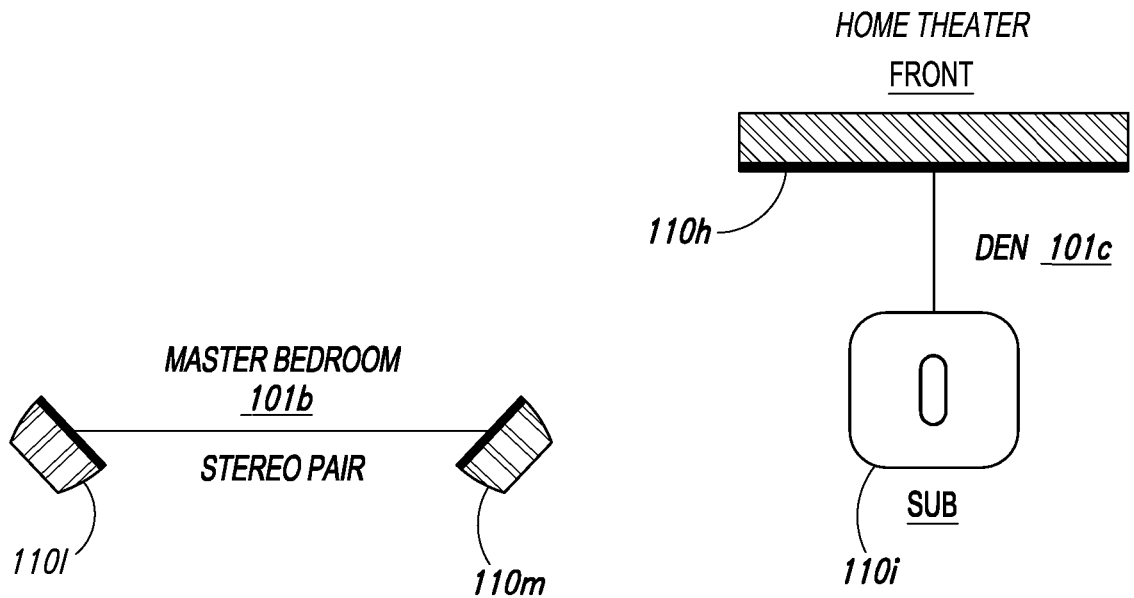
FIGS. 1I through 1L are schematic diagrams of corresponding media playback system zones.
Figures 1K, 1L:
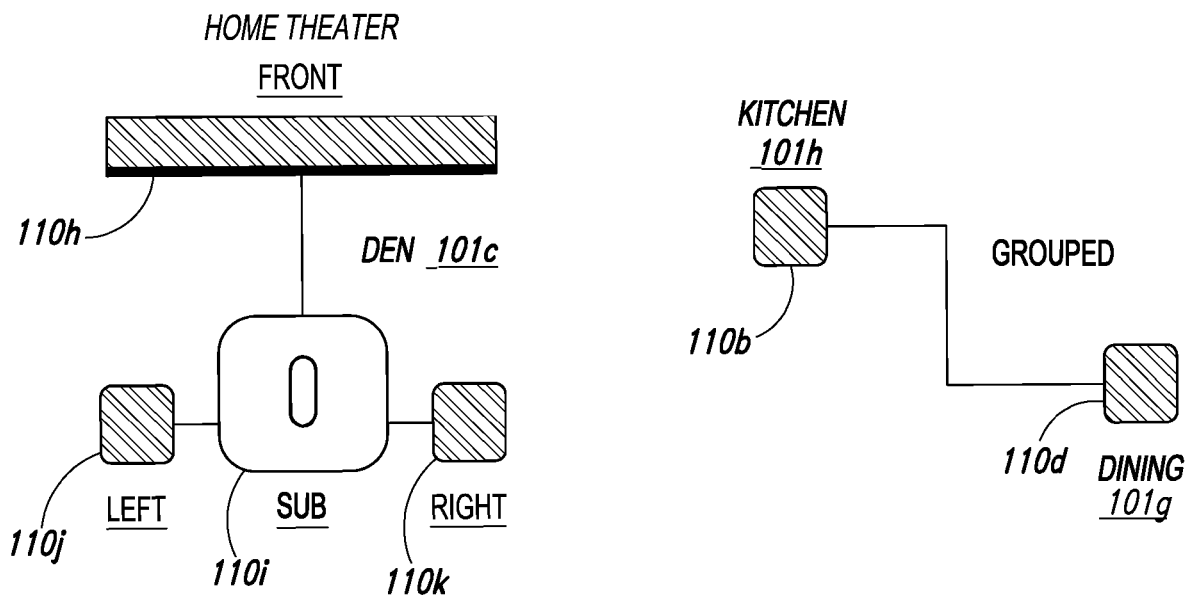
Figure 1M:
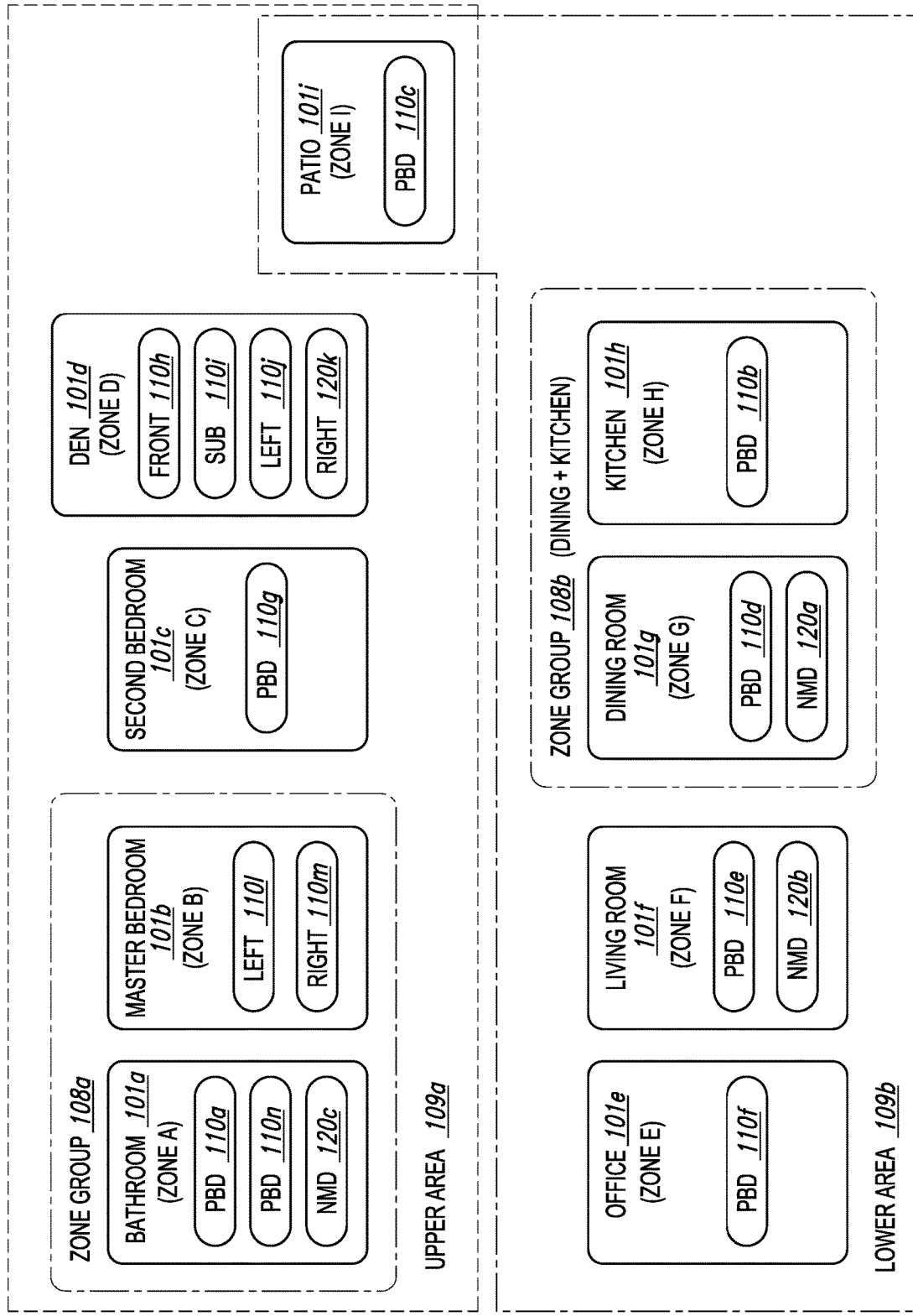
FIG. 1M is a schematic diagram of media playback system areas.

FIGS. 1I through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112c of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
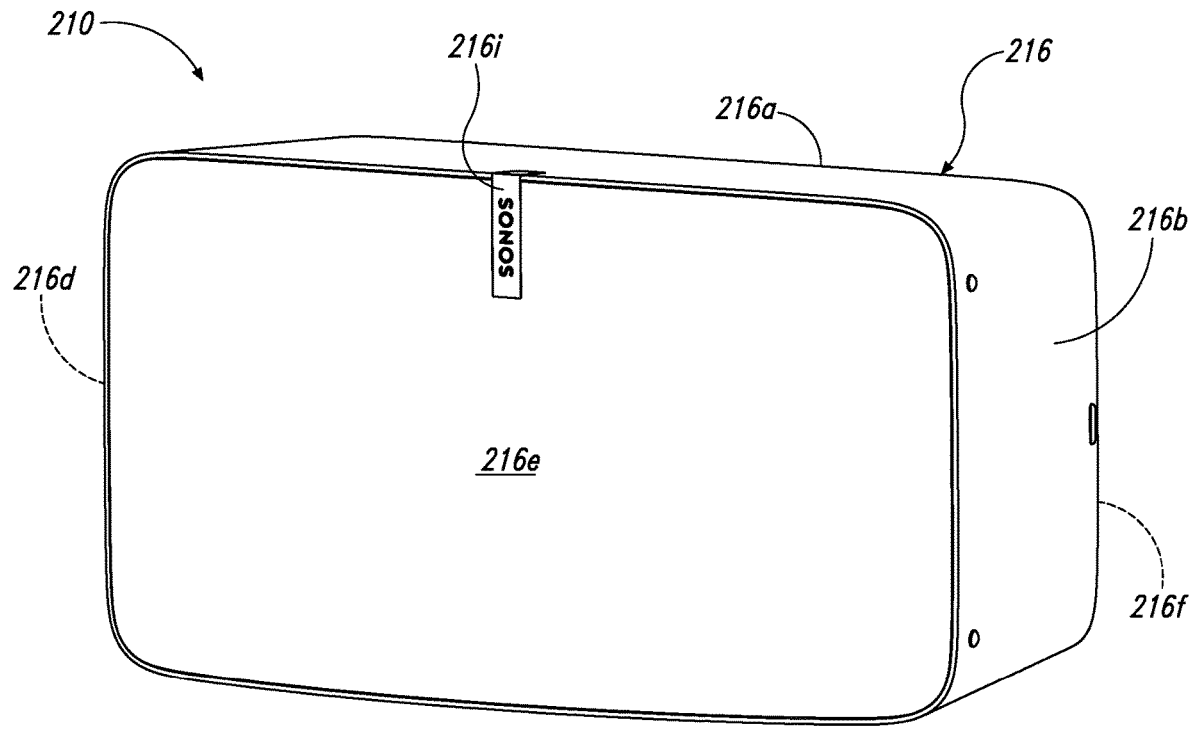
FIG. 2A is a front isometric view of a playback device configured in accordance with aspects of the disclosed technology.
Figure 2B:
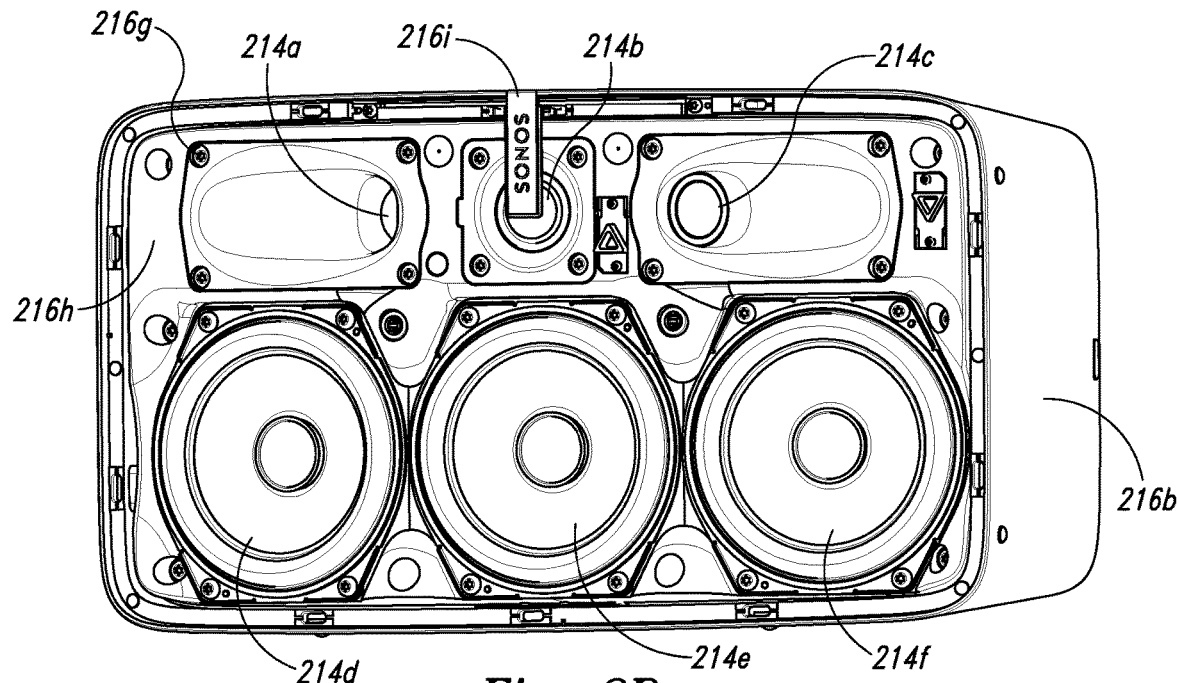
FIG. 2B is a front isometric view of the playback device of FIG. 3A without a grille.
Figure 2C:
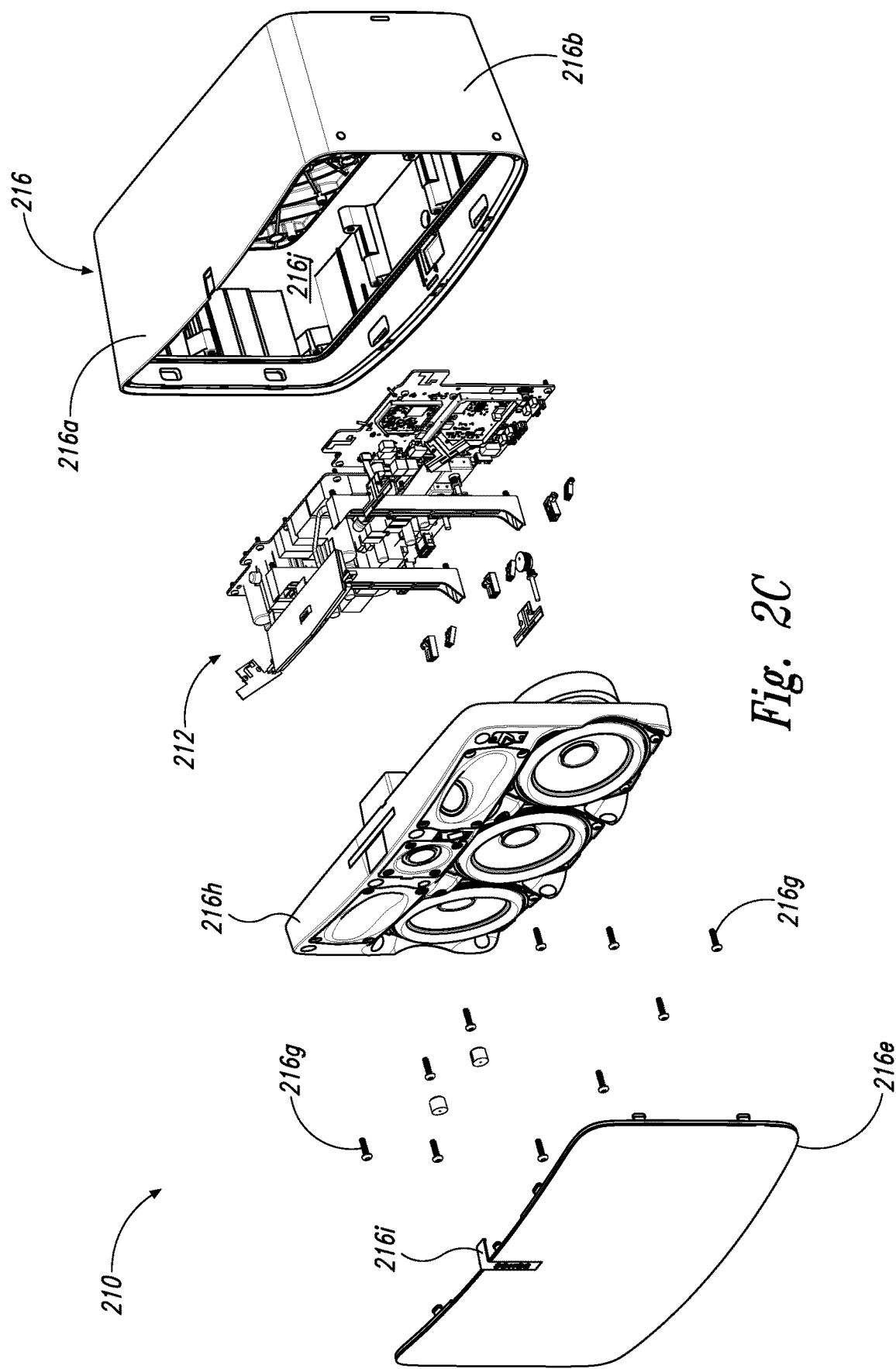
FIG. 2C is an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
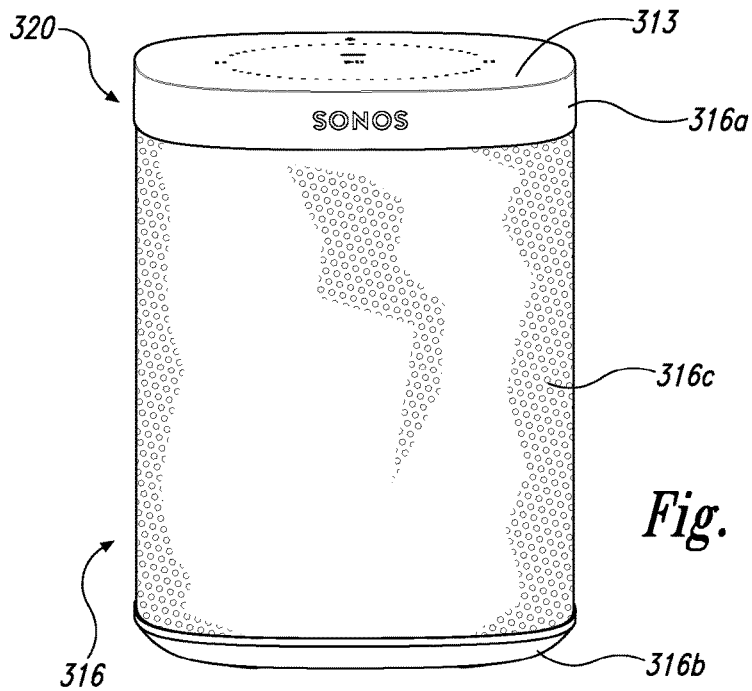
FIG. 3A is a front view of a network microphone device configured in accordance with aspects of the disclosed technology.
Figure 3B:
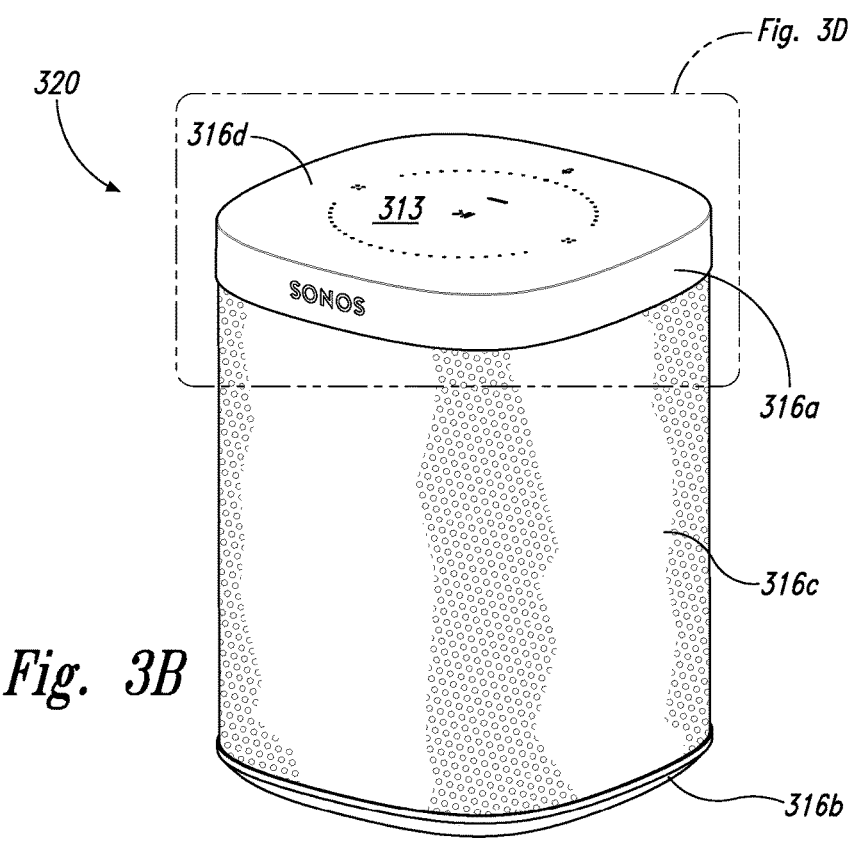
FIG. 3B is a side isometric view of the network microphone device of FIG. 3A.
Figure 3C:
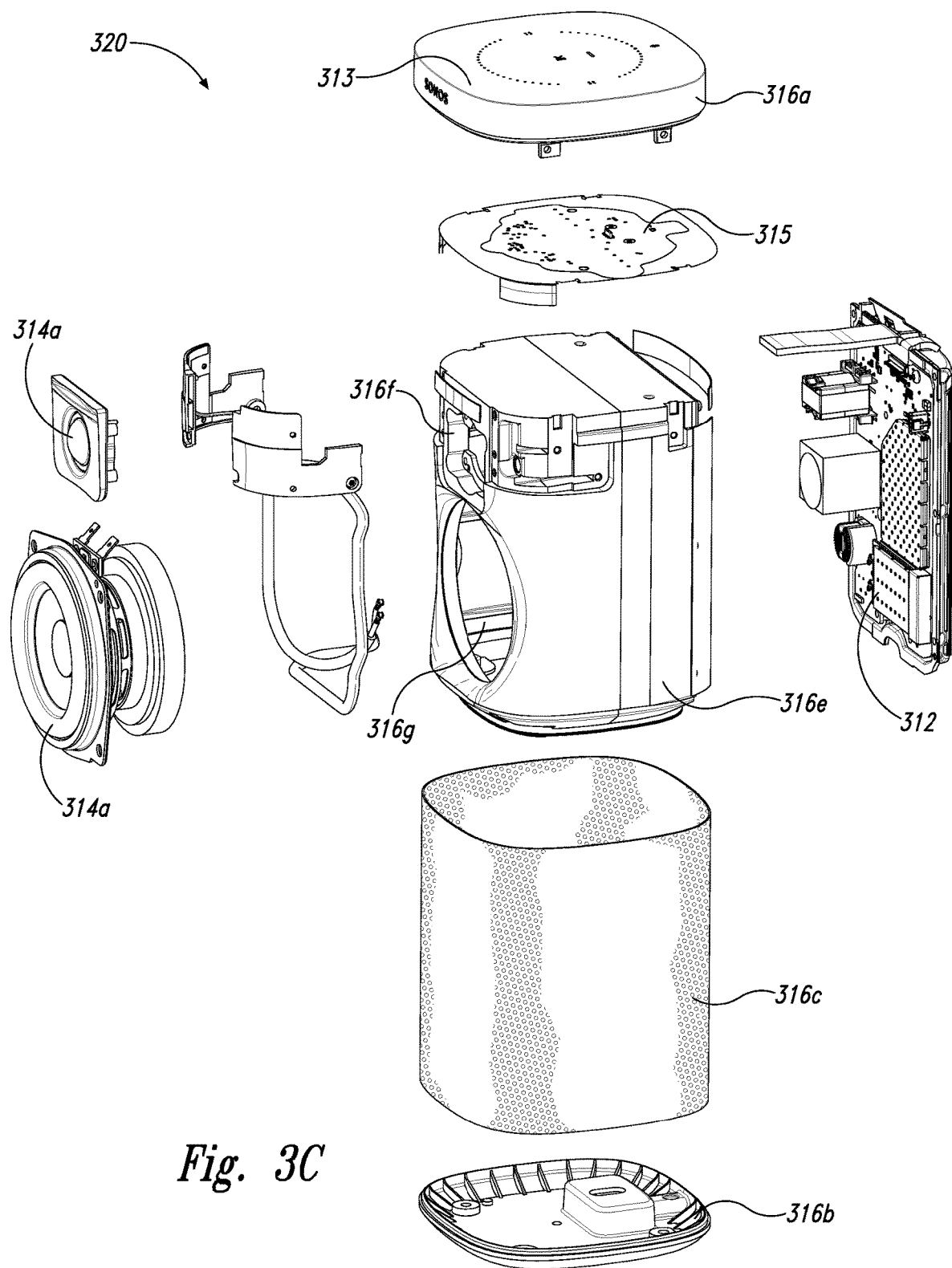
FIG. 3C is an exploded view of the network microphone device of FIGS. 3A and 3B.
Figure 3D:
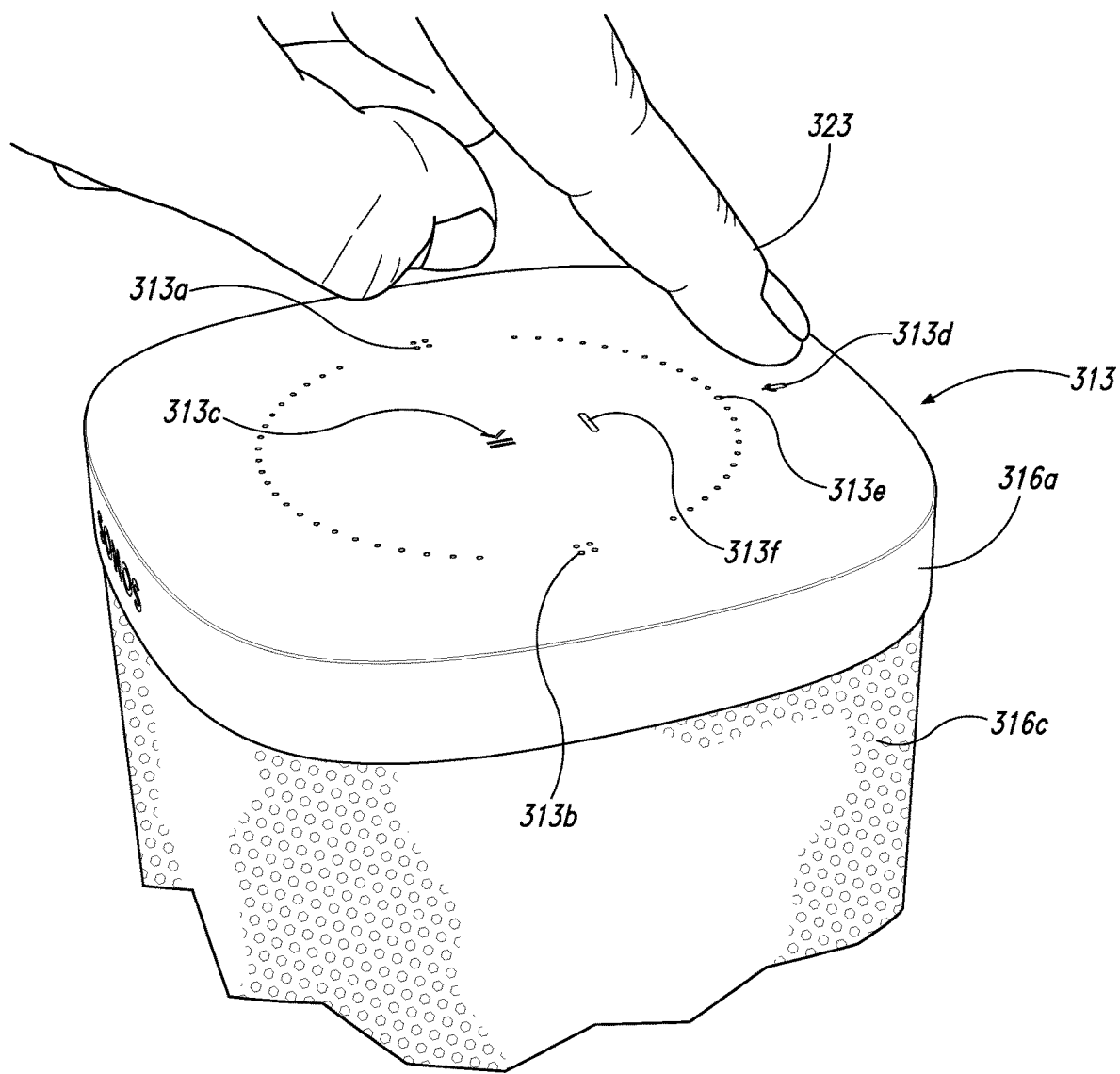
FIG. 3D is an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio data corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
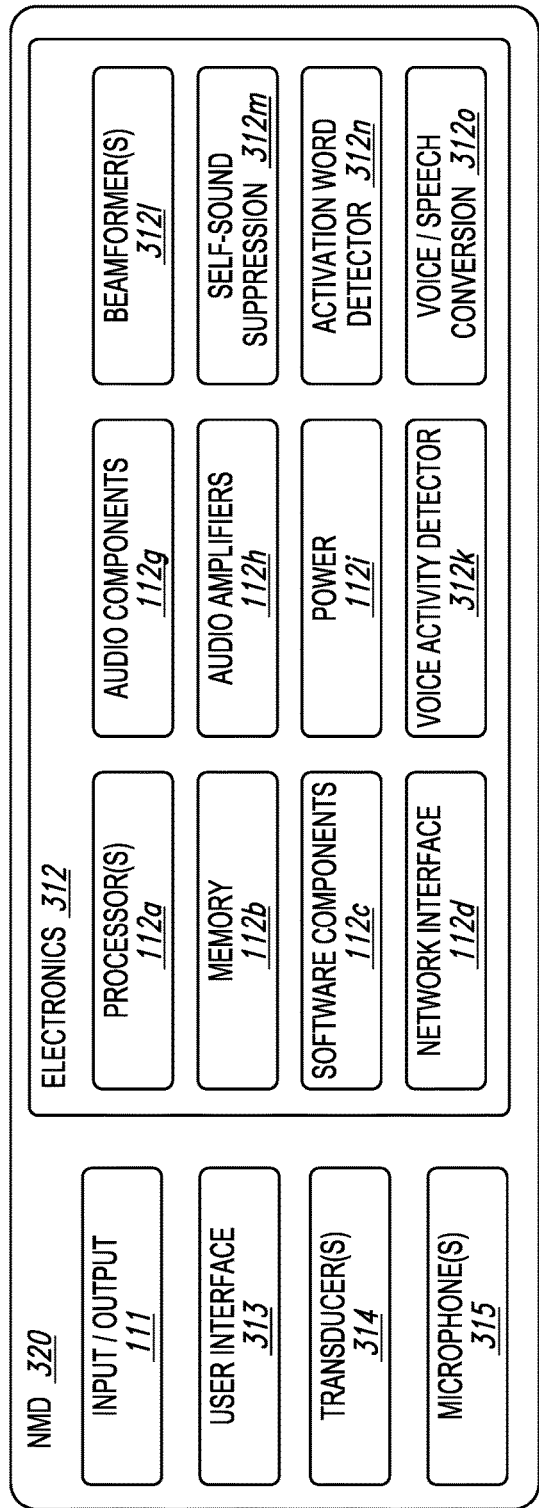
FIG. 3E is a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312$k$, beam former components 312$l$, acoustic echo cancellation (AEC) and/or self-sound suppression components 312$m$, activation word detector components 312$n$, and voice/speech conversion components 312$o$ (e.g., voice-to-text and text-to-voice). In the illustrated embodiment of FIG. 3E, the foregoing components 312$k$-312$o$ are shown as separate components. In some embodiments, however, one or more of the components 312$k$-312$o$ are subcomponents of the processors 112$a$. As noted below, in some embodiments the NMD 320 can include activation word detector components 312$n$ configured to detect multiple different activation words associated with different VASes. For example, the activation word detector components 312 can include a first activation-word detector configured to detect one or more activation words associated with a first VAS and a second activation-word detector configured to detect one or more activation words associated with a second VAS. In at least some embodiments, the voice input can be separately processed by one or both of these activation-word detectors. Upon detecting a first activation word using the first activation-word detector, the NMD 320 may suppress operation of the second activation-word detector, for example by ceasing providing voice input to the second activation-word detector for a predetermined time. This can help avoid interruption and cross-talk between different VASes.

The beamforming and self-sound suppression components 312$l$ and 312$m$ are configured to detect an audio signal and determine aspects of voice input represented in the detected audio signal, such as the direction, amplitude, frequency spectrum, etc. The voice activity detector activity components 312$k$ are operably coupled with the beamforming and AEC components 312$l$ and 312$m$ and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312$n$ are configured to monitor and analyze received audio to determine if any activation words (e.g., wake words) are present in the received audio. The activation word detector components 312$n$ may analyze the received audio using an activation word detection algorithm. If the activation word detector 312$n$ detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312$n$ runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312$n$ may run the received audio through the activation word detection algorithm for each supported voice service in parallel.

The speech/text conversion components 312$o$ may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
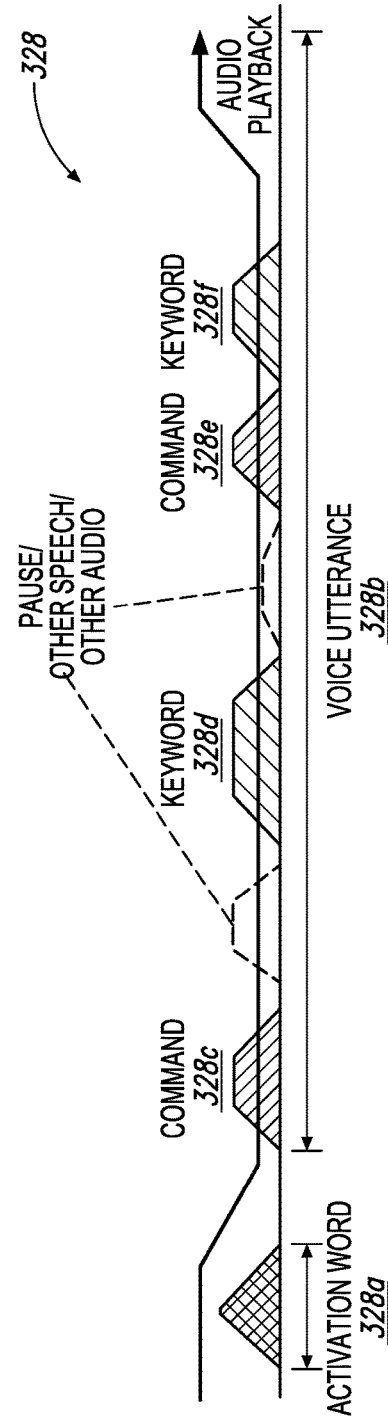
FIG. 3F is a schematic diagram of an example voice input.

FIG. 3F is a schematic diagram of an example voice input 328 captured by the NMD 320 in accordance with aspects of the disclosure. The voice input 328 can include an activation word portion 328$a$ and a voice utterance portion 328$b$. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328O. In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
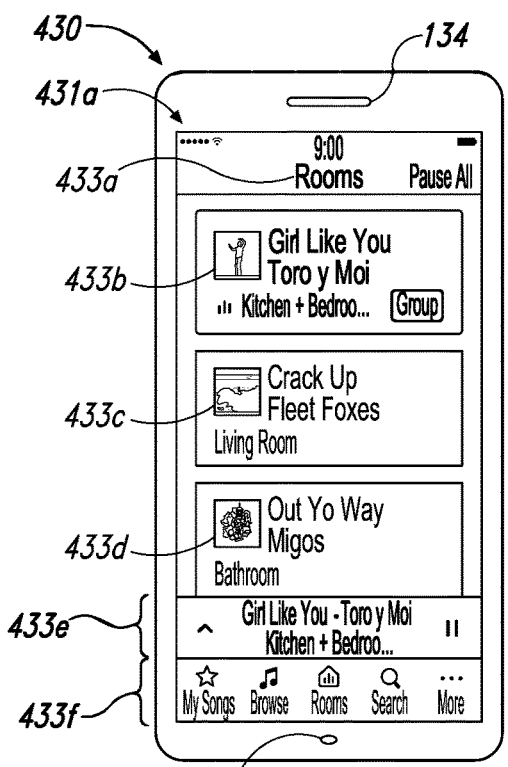
FIGS. 4A-4D are schematic diagrams of a control device in various stages of operation in accordance with aspects of the disclosed technology.
Figure 4B:
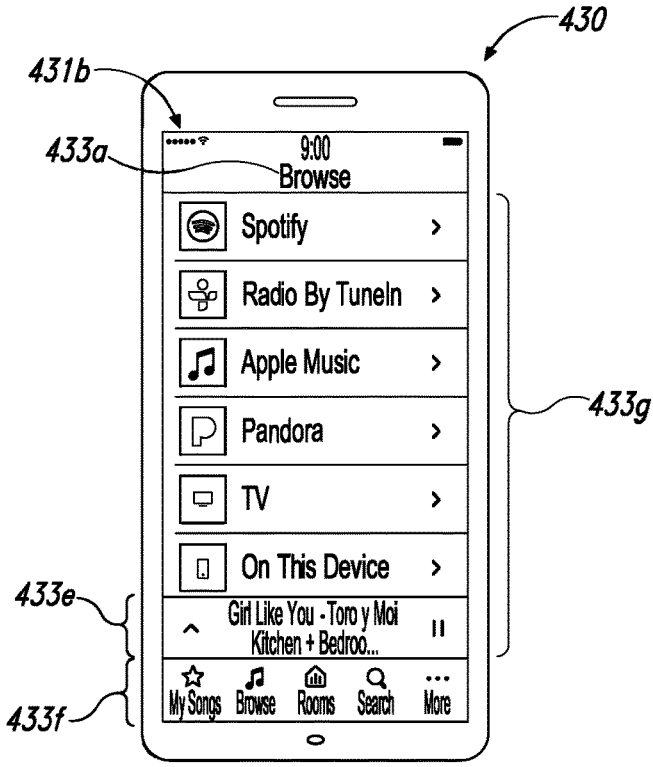
Figure 4C:
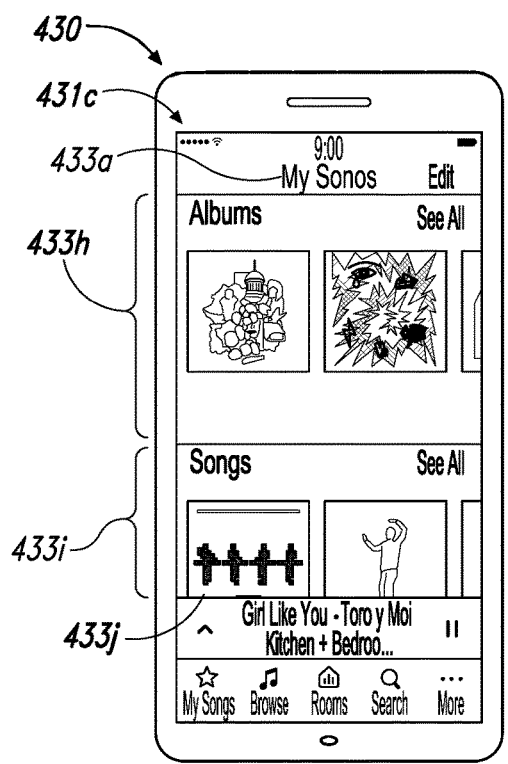
Figure 4D:
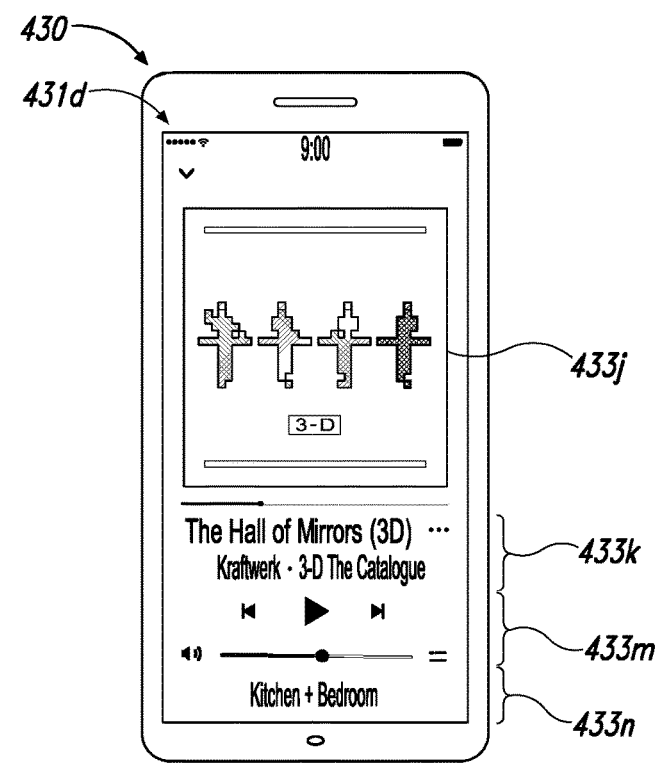

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
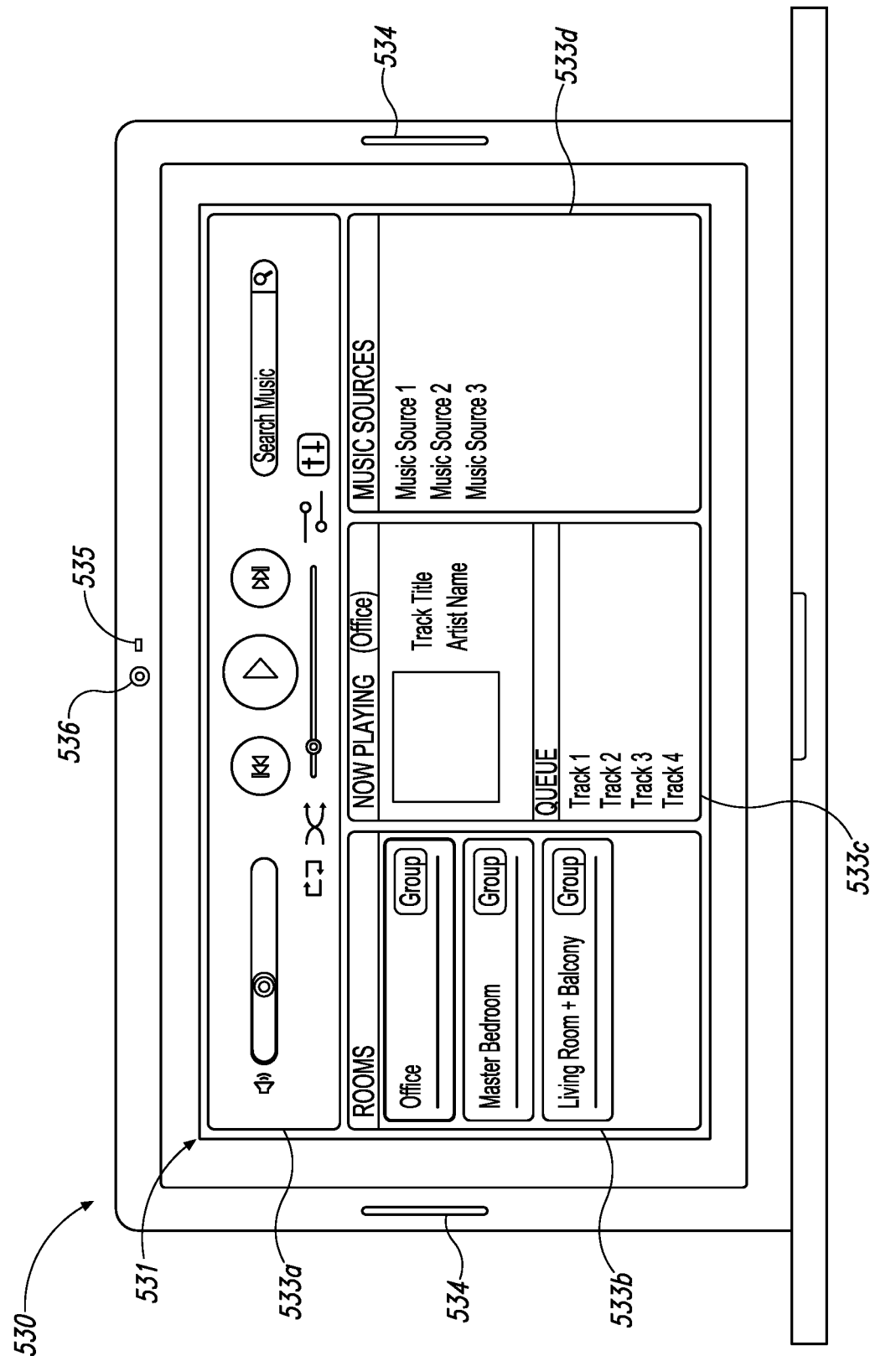
FIG. 5 is front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
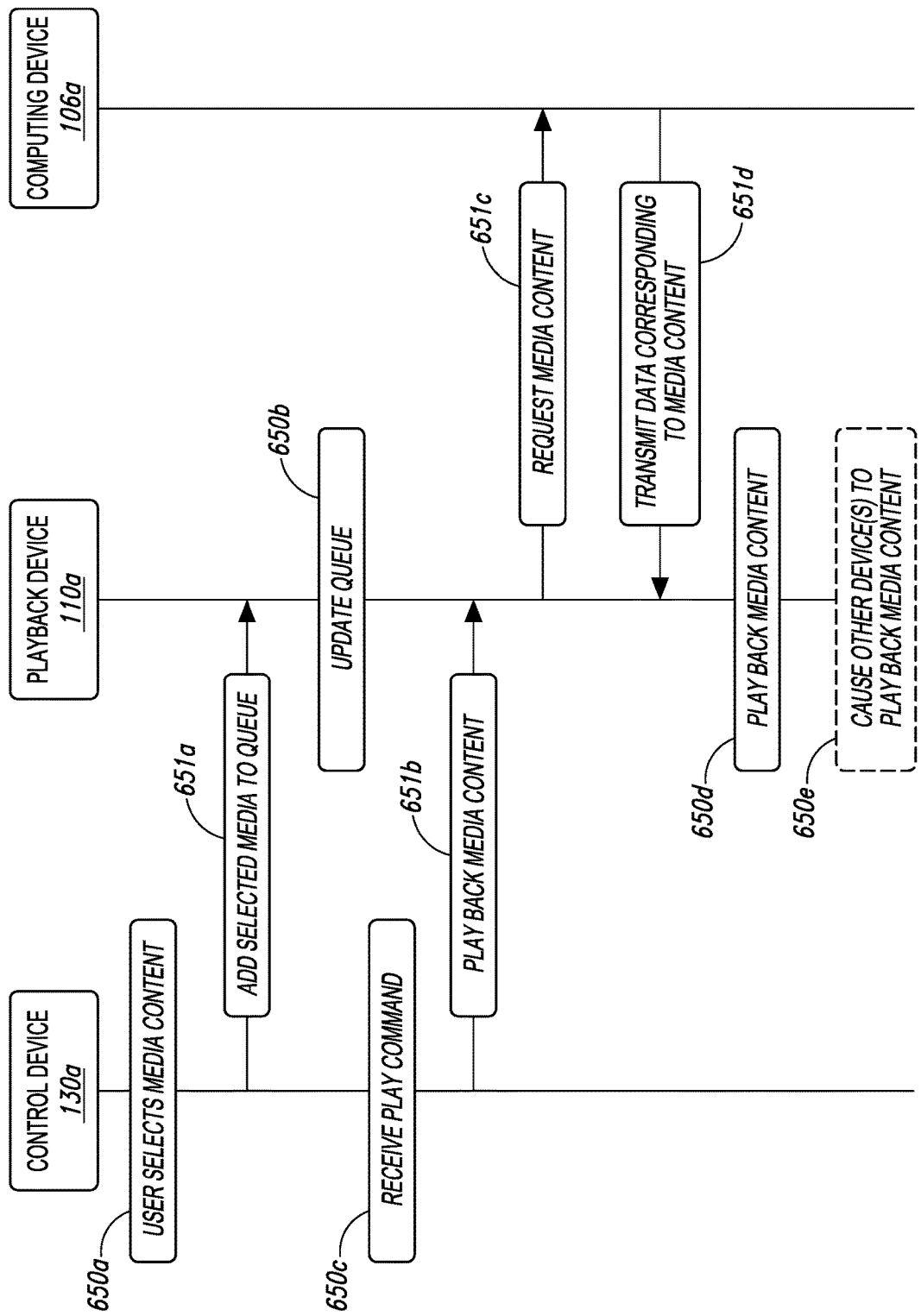
FIG. 6 is a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the computing device 106a requesting the selected media content. The computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the computing device 106a, and begin playback of the selected media content in response to a message from the playback device 110a such that all of the devices in the group play back the selected media content in synchrony.

III. Example Systems and Methods for Managing Multiple VASes

As discussed above, the MPS 100 may be configured to communicate with remote computing devices (e.g., cloud servers) associated with multiple different VASes. Although several examples are provided below with respect to managing interactions between two VASes, in various embodiments there may be additional VASes (e.g., three, four, five, six, or more VASes), and the interactions between these VASes can be managed using the approaches described herein. In various embodiments, in response to detecting a particular activation word, the NMDs 120 may send voice inputs over a network 102 to the remote computing device(s) associated with the first VAS 190 or the second VAS 191 (FIG. 1B). In some embodiments, the one or more NMDs 120 only send the voice utterance portion 328b (FIG. 3F) of the voice input 328 to the remote computing device(s) associated with the VAS(es) (and not the activation word portion 328a). In some embodiments, the one or more NMDs 120 send both the voice utterance portion 328b and the activation word portion 328a (FIG. 3F) to the remote computing device(s) associated with the VAS(es).

Figure 7:
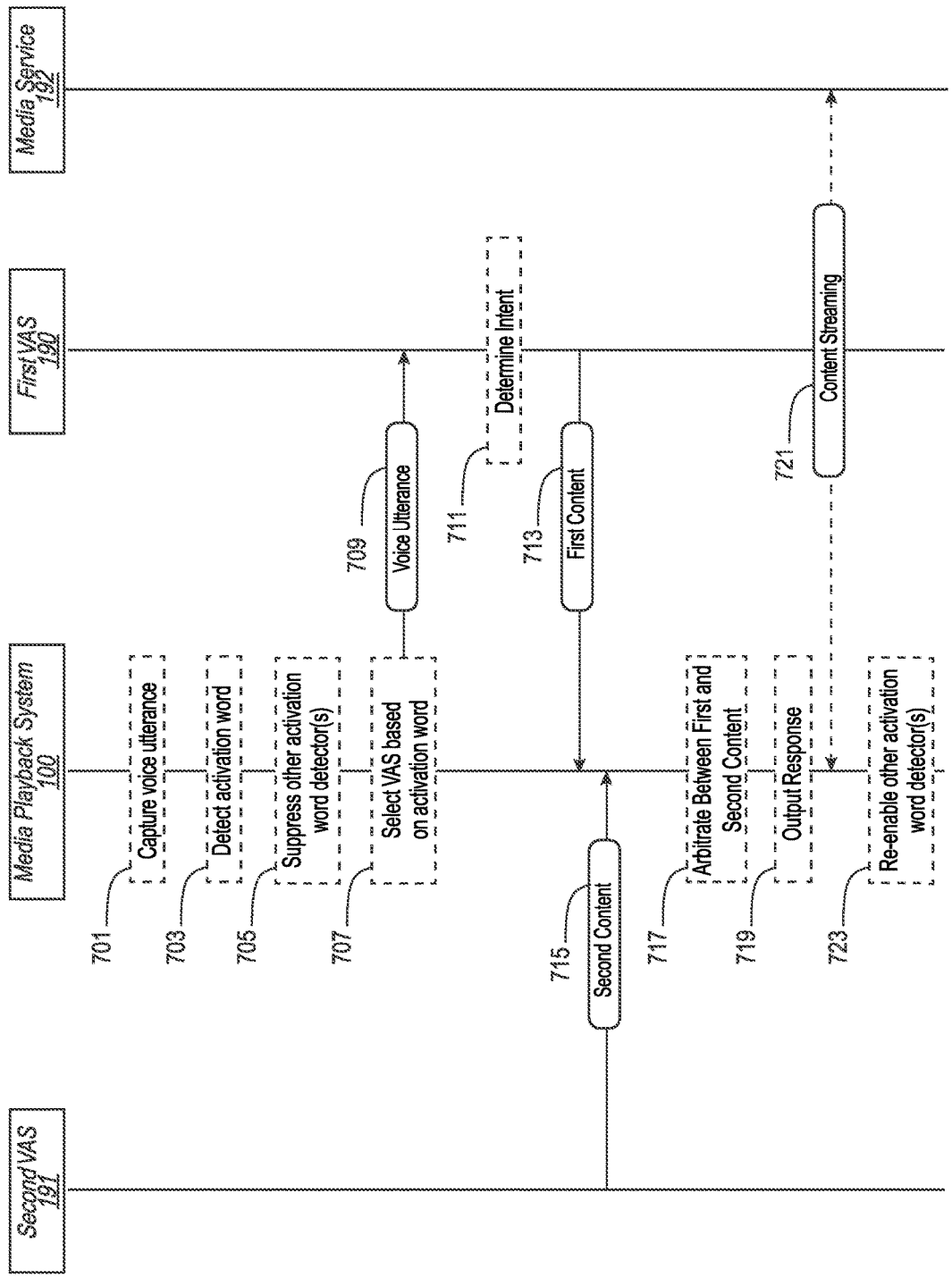
FIG. 7 is an example message flow diagram between a media playback system and first and second voice assistant services.

FIG. 7 is a message flow diagram illustrating various data exchanges between the MPS 100 and the remote computing devices. The media playback system 100 captures a voice input via a network microphone device in block 701 and detects an activation word in the voice input in block 703 (e.g., via activation-detector components 312n (FIG. 3E)). Once a particular activation word has been detected (block 703), the MPS 100 may suppress other activation word detector(s) in block 705. For example, if the activation word "Alexa" is detected in the voice utterance in block 703, then the MPS 100 may suppress operation of a second activation-word detector configured to detect a wake word such as "OK, Google." This can reduce the likelihood of cross-talk between different VASes, by reducing or eliminating the risk that second VAS mistakenly detects its activation word during a user's active dialogue session with a first VAS. This can also preserve user privacy by eliminating the possibility of a user's voice input intended for one VAS being transmitted to a different VAS.

In some embodiments, suppressing operation of the second activation-word detector involves ceasing providing voice input to the second activation-word detector for a predetermined time, or until a user interaction with the first VAS is deemed to be completed (e.g., after a predetermined time has elapsed since the last interaction—either a text-to-speech output from the first VAS or a user voice input to the first VAS). In some embodiments, suppression of the second activation-word detector can involve powering down the second activation-word detector to a low-power or no-power state for a predetermined time or until the user interaction with the first VAS is deemed complete.

In some embodiments, the first activation-word detector can remain active even after the first activation word has been detected and the voice utterance has been transmitted to the first VAS, such that a user may utter the first activation word to interrupt a current output or other activity being performed by the first VAS. For example, if a user asks Alexa to read a news flash briefing, and the playback device begins to play back the text-to-speech (TTS) response from Alexa, a user may interrupt by speaking the activation word followed by a new command. Additional details regarding arbitrating between activation-word detection and playback of content from a VAS are provided below with respect to FIG. 9.

With continued reference to FIG. 7, in block 707, the media playback system 100 may select an appropriate VAS based on particular activation word detected in block 703. If the second VAS 191 is selected, the media playback system 100 may transmit one or messages (e.g., packets) containing the voice input to the second VAS 191 for processing. In the illustrated message flow, the first VAS 190 is selected in block 707. Upon this selection, the media playback system 100 transmits one or more messages 709 (e.g., packets) containing the voice utterance (e.g., voice utterance 328b of FIG. 3F) to the first VAS 190. The media playback system 100 may concurrently transmit other information to the first VAS 190 with the message(s) 709. For example, the media playback system 100 may transmit data over a metadata channel, as described in for example, in previously referenced U.S. application Ser. No. 15/438,749.

The first VAS 190 may process the voice input in the message(s) 709 to determine intent (block 711). Based on the intent, the first VAS 190 may send content 713 via messages (e.g., packets) to the media playback system 100. In some instances, the response message(s) 713 may include a payload that directs one or more of the devices of the media playback system 100 to execute instructions. For example, the instructions may direct the media playback system 100 to play back media content, group devices, and/or perform other functions. In addition or alternatively, the first content 713 from the first VAS 190 may include a payload with a request for more information, such as in the case of multi-turn commands.

In some embodiments, the first content 713 can be assigned to different categories that are treated differently when arbitrating between content received from different VASes. Examples of the first content 713 include (i) text-to-speech (TTS) responses (e.g., "it is currently 73 degrees" in response to a user's query regarding the temperature outside), (ii) alarms and timers (e.g., timers set by a user, calendar reminders, etc.), (iii) user broadcasts (e.g., in response to a user instructing Alexa to "tell everyone that dinner is ready," all playback devices in a household are instructed to play back "dinner is ready"), and (iv) other media content (e.g., news briefings, podcasts, streaming music, etc.). As used herein a TTS response can include instances in which a VAS provides a verbal response to a user input, query, request, etc. to be played back via a playback device. In some embodiments, the first content 713 received from the first VAS 190 can include metadata, tags, or other identifiers regarding the type of content (e.g., a tag identifying the first content 713 as TTS, as an alarm or timer, etc.). In other embodiments, the MPS 100 may inspect the first content 713 to otherwise determine to which category the first content 713 belongs.

At any point along this process, the second VAS 191 may transmit second content 715 via messages (e.g., packets) to the media playback system 100. This second content 715 may likewise include a payload that directs one or more of the devices of the media playback system 100 to execute instructions such as playing back media content or performing other functions. The second content 715, like the first content 713, can take a variety of forms including a TTS output, an alarm or timer, a user broadcast, or other media content. Although the second content 715 here is illustrated as being transmitted at a particular time in the flow, in various embodiments the second content may be transmitted earlier (e.g., prior to transmission of the first content 713 from the first VAS 190 to the MPS 100) or later (e.g., after the MPS 100 has output a response in block 719, for example by playing back the first content 713). In at least some embodiments, the second content 715 is received during playback of the first content 713.

In block 717, the MPS 100 arbitrates between the first content 713 received from the first VAS 190 and the second content 715 received from the second VAS 191. Following arbitration, the MPS 100 may output a response in block 719. The particular operations performed during arbitration between the first and second content may depend on the characteristics of the first and second content, on the particular VASes selected, the relative times at which the first and second content are received, and other factors. For example, in some cases, the MPS 100 may suppress the second content while playing back the first content. As used herein, suppressing the second content can include delaying playback of the second content, pausing playback of the second content (if playback is already in progress), and/or canceling or ceasing playback of the second content altogether. In some cases, the MPS 100 may suppress the first content while playing back the second content. In some embodiments, suppressing playback of the first content can include "ducking" the first content while the second content is played back concurrently with the first content.

When arbitrating between the first and second content in block 717, the MPS 100 may rely at least in part on the category of content (e.g., a TTS output, an alarm or timer, a user broadcast, or other media content) received from each VAS to determine how playback should be handled. Various examples are provided below, in which the MPS 100 arbitrates between the first content 713 and the second content 715, for example by determining which content to play back and which to suppress, as well as whether to queue, duck, or cancel the suppressed content, etc.

In one example, the first content 713 is a TTS response, an alarm or timer, or a user broadcast, and the second content 715 is a timer or alarm. In this instance, the second content 715 (timer or alarm) may interrupt and cancel or queue the first content 713. This permits a user's pre-set alarms or timers to be honored for their assigned times, regardless of the content currently being played back.

In another example, the first content 713 is a TTS response, an alarm or timer, or a user broadcast, and the second content 715 is a user broadcast. In this instance, the second content 715 (user broadcast) is queued until after the first content is played back, without suppressing or otherwise interrupting the first content. This reflects the determination that, within a single household, it may be undesirable for one user's broadcast to interrupt playback of other content, such as another user's active dialogue session with a VAS.

In an additional example, the first content 713 can be streaming media (e.g., music, a podcast, etc.), and the second content 715 can be a TTS response, a timer or alarm, or a user broadcast. In this case, the first content 713 can be paused or "ducked" while the second content 715 is played back. After playback of the second content 715 is complete, the first content 713 can be unducked or unpaused and playback can continue as normal.

In yet another example, the first content 713 is other media such as a podcast, streaming music, etc., and the second content 715 is also of the same category, for example another podcast. In this case, the second content 715 may replace the first content 713, and the first content 713 can be deleted or canceled entirely. This reflects the assumption that a user wishes to override her previous selection of streaming content with the new selection via the second VAS 191.

In still another example, the first content 713 is an alarm or timer, and the second content 715 is a TTS response that is received during playback of the alarm or timer. Here, the first content 713 (alarm or timer) can be suppressed and the second content can be played back. In this instance, a user who has heard a portion of a timer or alarm likely does not wish the alarm or timer to resume after an intervening dialogue session with a VAS has ended.

As a further example, the first content 713 can be a user broadcast, and the second content 715 can be a TTS output, another user broadcast, or an alarm or timer. Here, the first content 713 can be suppressed (e.g., queued or canceled) while the second content 715 (the TTS output, the alarm or timer, or other user broadcast) is played back.

Although the above examples describe optional arbitration determinations made by the MPS 100, various other configurations and determinations are possible depending the desired operation of the MPS 100. For example, in some embodiments the MPS 100 may allow play back of any user broadcasts over any other currently played back content, while in another embodiment the MPS 100 may suppress playback of user broadcasts until playback of other media has completed. In various embodiments, the MPS 100 may suppress playback of the second content while allowing playback of the first content (or vice versa) based on the type of content, other content characteristics (e.g., playback length), the time at which the respective content is received at the MPS 100, particular user settings or preferences, or any other factor.

In block 719, the MPS 100 outputs a response, for example by playing back the selected content as determined via the arbitration in block 717. As noted above, this can include playing back the first content 713 while suppressing (e.g., canceling or queuing) playback of the second content 715, or alternatively this can include playing back the second content 715 while suppressing (e.g., canceling, queuing, or ducking) playback of the first content 713. In some embodiments, the first content 713 sent from the first VAS 190 may direct the media playback system 100 to request media content, such as audio content, from the media service(s) 192. In other embodiments, the MPS 100 may request content independently from the first VAS 190. In either case, the MPS 100 may exchange messages for receiving content, such as via a media stream 721 comprising, e.g., audio content.

In block 723, the other activation word detector(s) can be re-enabled. For example, the MPS 100 may resume providing voice4 input to the other activation-word detector(s) after a predetermined time or after the user's interaction with the first VAS 190 is deemed to be completed (e.g., after a predetermined time has elapsed since the last interaction—either a text-to-speech output from the first VAS or a user voice input to the first VAS). Once the other activation word detector(s) have been re-enabled, a user may initiate interaction with any available VAS by speaking the appropriate activation word or phrase.

Figure 8:
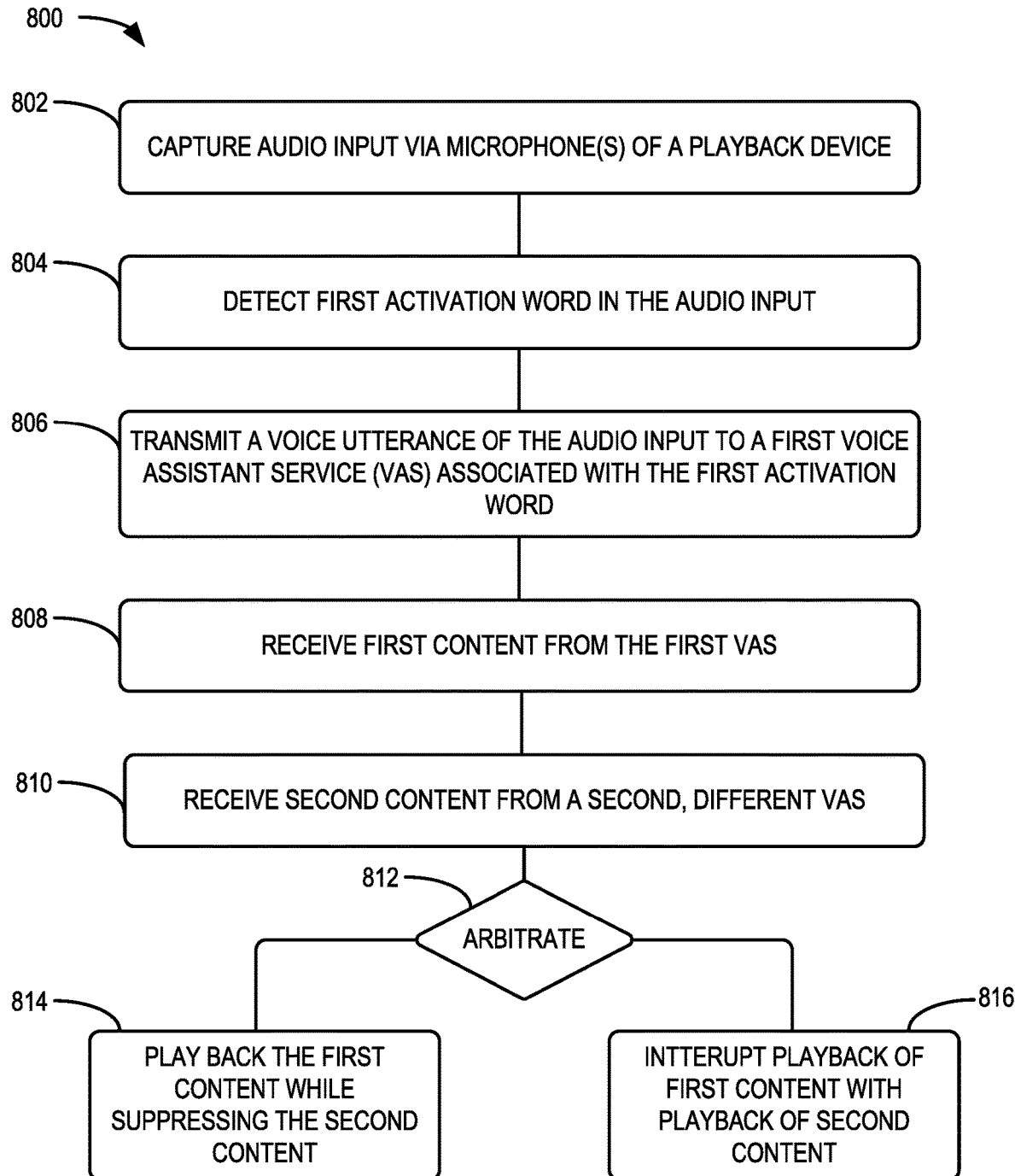
FIG. 8 is a flow diagram of a method for managing content from first and second voice assistant services.

FIG. 8 is an example method 800 for managing interactions between a playback device and multiple VASes. Various embodiments of method 800 include one or more operations, functions, and actions illustrated by blocks 802 through 812. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

Method 800 begins at block 802, which involves the playback device capturing audio input via one or more microphones as described above. The audio input can include a voice input, such as voice input 328 depicted in FIG. 3F.

At block 804, method 800 involves the playback device using a first activation-word detector (e.g., activation word detector components 312n of FIG. 3E) to detect an activation word in the audio input. In some embodiments, the activation word can be one or more of (i) the activation word "Alexa" corresponding to AMAZON voice services, (ii) the activation word "Ok, Google" corresponding to GOOGLE voice services, or (iii) the activation word "Hey, Siri" corresponding to APPLE voice services.

Responsive to detecting the first activation word in the audio input in block 804, the playback device transmits a voice utterance of the audio input to a first VAS associated with the first activation word in block 806. For example, if the detected activation word in block 804 is "Alexa," then then in block 806 the playback device transmits the voice utterance to one or more remote computing devices associated with AMAZON voice services. As noted previously, in some embodiments, the playback device only transmits the voice utterance portion 328b (FIG. 3F) of the voice input 328 to the remote computing device(s) associated with the first VAS (and not the activation word portion 328a). In some embodiments, the playback device transmits both the voice utterance portion 328b and the activation word portion 328a (FIG. 3F) to remote computing device(s) associated with the first VAS.

In block 808, the playback device receives first content from the first VAS, and in block 810, the playback device receives second content from a second, different VAS. In block 810, the playback device arbitrates between the first content and the second content. As described above with respect to FIG. 7, this arbitration can depend at least in part on the category of each content, for example (i) TTS responses, (ii) alarms or timers, (iii) user broadcasts, and (iv) other media content (e.g., news briefings, podcasts, streaming music, etc.). In some embodiments, an alarm or timer may interrupt any other active playback, whether a TTS response, another alarm or timer, a user broadcast, or other media content. In some embodiments, a user announcement does not interrupt a TTS response, an alarm or timer, or another user announcement, but instead is queued to be played back after the first content has been played back completely. Various other rules and configurations for arbitration can be used to manage content received from two or more VASes to enhance user experience, as described above.

In one outcome of the arbitration in block 812, the method 800 continues in block 814 with playing back the first content while suppressing the second content. Such suppression can take the form of delaying playback of the second content until after the first content has been played back or canceling playback of the second content altogether.

In an alternative outcome of the arbitration in block 812, the method continues in block 816 with interrupting playback of the first content with playback of the second content. The first content, which is interrupted, can either be canceled altogether, or can be queued for later playback after the first content has been played back in its entirety. In some embodiments, the first playback is "ducked" while the second content is played back. After the second content has been played back completely, the first content can be "unducked".

Figure 9:
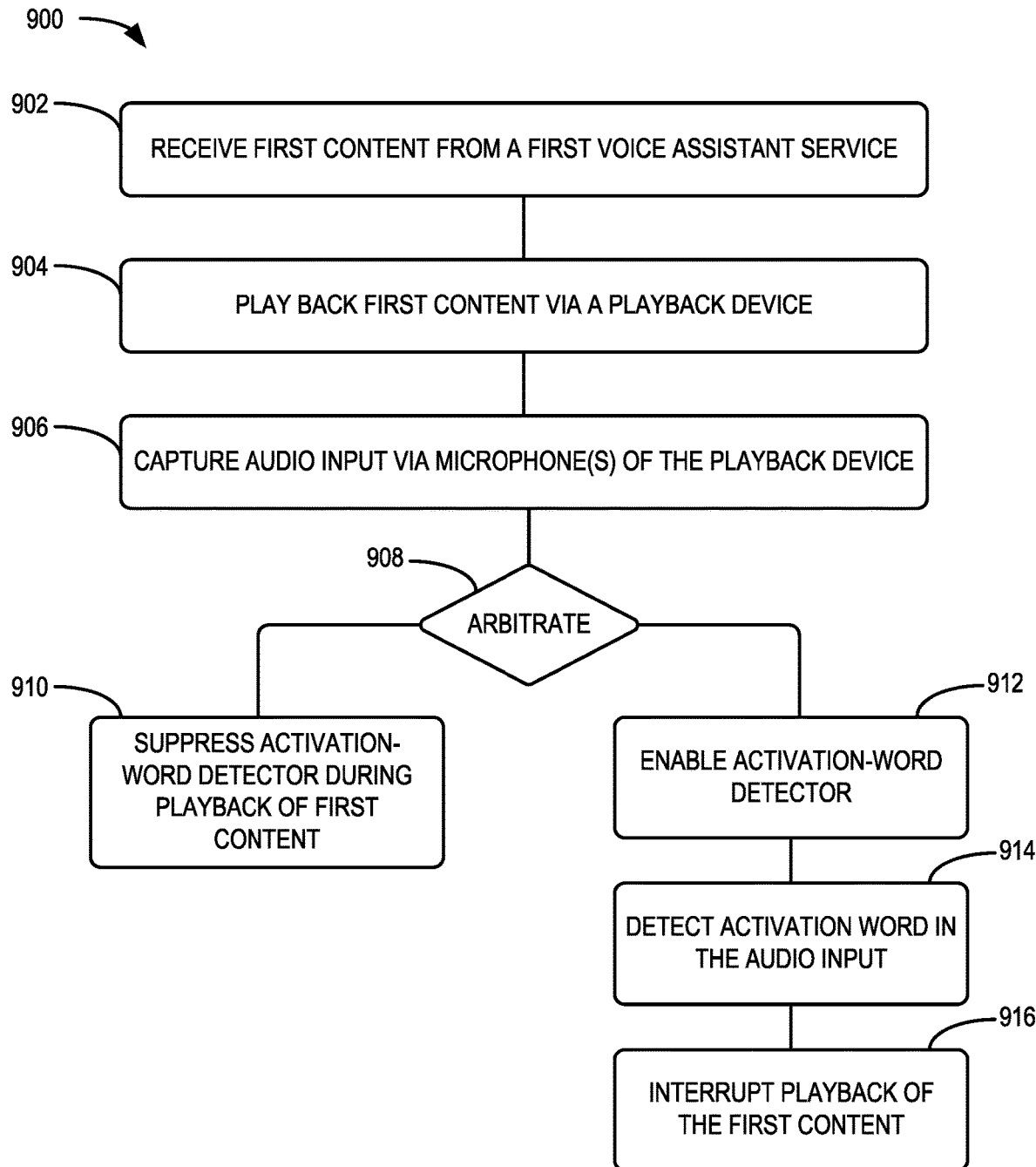
FIG. 9 is a flow diagram of a method for managing activation-word detection during playback of content from a voice assistant service.

FIG. 9 is an example method 900 for managing activation-word detection during playback of content from a voice assistant service (VAS). Various embodiments of method 900 include one or more operations, functions, and actions illustrated by blocks 902 through 918. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

Method 900 begins at block 902, with receiving first content from a first VAS, and in block 904 the playback device plays back the first content. In various embodiments, the first content can be an alarm or timer, a user broadcast, a TTS output, or other media content.

At block 906, the playback device captures audio input via one or more microphones as described above. The audio input can include a voice input, such as voice input 328 depicted in FIG. 3F.

At block 908, the playback device arbitrates between the captured audio input and the playback of the first content from the first VAS. For example, the playback device may permit a detected activation word in the voice input to interrupt playback of the first device, or the playback device may suppress operation of the activation word detector so as not to interrupt playback of the first content. This arbitration can depend on the identity of the VAS that provides the first content, as well as the VAS associated with the potential activation word. This arbitration can also depend on the category of content being played back, for example an alarm/timer, a user broadcast, a TTS output, or other media content.

In one example, if the first content is a TTS output from a first VAS, the playback device may suppress operation of any activation-word detectors associated with any other VASes, while still permitting operation of the activation-word detector associated with the first VAS. As a result, a user receiving a TTS output from Alexa may interrupt the output by speaking the "Alexa" activation word, but speaking the "OK Google" activation word would not interrupt playback of the TTS output from Alexa.

In another example, if the first content is a user broadcast, the playback device may continue to monitor audio input for activation word(s) during playback. If an activation word is detected for any VAS, then the user broadcast can be canceled or queued while the user interacts with the selected VAS. In some embodiments, this interruption of a user broadcast is permitted regardless of which VAS directed the broadcast and which VAS is associated with the detected activation word.

In yet another example, if the first content is an alarm or timer, the playback device may continue to monitor audio input for activation word(s) during playback. If an activation word is detected, then the timer or alarm can be canceled or queued while the user interacts with the selected VAS. In some embodiments, this interruption of a timer or alarm is permitted regardless of which VAS directed the timer or alarm and which VAS is associated with the detected activation word.

Various other rules and configurations are possible for arbitrating between playback of content from a first VAS and monitoring captured audio for potential activation word(s) of the first VAS and/or any additional VASes. For example, the playback device might permit a user to interrupt any content whatsoever if an activation word associated with a preferred VAS is spoken, while speaking an activation word associated with a non-preferred VAS may interrupt only certain content.

As one outcome following the arbitration in block 908, in block 910 the playback device suppresses the activation-word detector during playback of the first content. The activation-word detector can be suppressed by ceasing to provide captured audio input to the activation-word detector or by otherwise causing the activation-word detector to pause evaluation of audio input for a potential activation word. In this instance, the user is not permitted to interrupt the playback of the first content, even using an activation word.

In the alternative outcome following the arbitration in block 908, in block 912 the playback device enables the activation word detector, for example by providing the audio input to the activation word detector of the playback device. At block 914, method 900 involves the playback device using an activation-word detector (e.g., activation word detector components 312*n* of FIG. 3E) to detect an activation word in the audio input. In some embodiments, the activation word can be one or more of (i) the activation word "Alexa" corresponding to AMAZON voice services, (ii) the activation word "Ok, Google" corresponding to GOOGLE voice services, or (iii) the activation word "Hey, Siri" corresponding to APPLE voice services.

Responsive to detecting the first activation word in the audio input in block 914, the playback device interrupts playback of the first content in block 916. In place of the content, an active dialogue or other interaction can proceed between the user and the VAS associated with the activation word detected in block 914. In some embodiments, the interruption can include canceling or queuing playback of the first content. In some embodiments, interruption of the first content can include "ducking" the first content while a user interacts with the VAS associated with the activation word detected in block 914.

IV. Conclusion

The above discussions relating to playback devices, controller devices, playback zone configurations, voice assistant services, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A system comprising:
   one or more microphones;
   one or more processors;
   at least one non-transitory computer-readable medium; and
   program instructions stored on the at least one non-transitory computer-readable medium that, when executed by the one or more processors, cause the system to perform operations comprising:
   capturing audio input via the one or more microphones;
   monitoring, via a first wake-word detector, the captured audio input for a first wake word associated with a first voice assistant service (VAS);
   monitoring, via a second wake-word detector, the captured audio input for a second wake word associated with a second VAS different from the first VAS;
   detecting, via the first wake-word detector, the first wake word in the captured audio input;
   after detecting the first wake word, obtaining, based on the captured audio input, first content to be played back via a playback device;
   playing back, via the playback device, the first content;
   while playing back the first content, detecting, via the second wake-word detector, the second wake word in the captured audio input;
   after detecting the second wake word:
   suspending operation of the first wake-word detector;
   obtaining, based on the captured audio input, second content to be played back via the playback device; and
   suppressing playback of the first content;
   while the playback of the first content is suppressed, playing back, via the playback device, the second content; and
   after playing back the second content:
   resuming playback of the first content; and
   resuming monitoring the captured audio input for the first wake word.

2. The system of claim 1, wherein the operations further comprise:
   determining a content type associated with the first content; and
   based at least in part on the content type and on an identity of the second VAS, suspending operation of the first wake-word detector while playing back the second content.

3. The system of claim 1, wherein the first content comprises at least one of: a text-to-speech output from the first VAS, an alarm, or a timer.

4. The system of claim 1, wherein suspending operation of the first wake-word detector comprises powering down the first wake-word detector to a low-power or no-power state.

5. The system of claim 1, wherein suppressing playback of the first content comprises one of:
   ducking the first content while playing back the second content; or
   interrupting the first content while playing back the second content.

6. The system of claim 1, wherein obtaining, based on the captured audio input, first content to be played back via the playback device comprises:
   after detecting the second wake word, transmitting, via a network interface of the system, a voice utterance of the captured audio input to one or more remote computing devices associated with the first VAS; and
   receiving, from the one or more remote computing devices associated with the first VAS, the first content to be played back via the playback device.

7. The system of claim 1, wherein obtaining, based on the captured audio input, first content to be played back via the playback device comprises:
   after detecting the first wake word, transmitting, via a network interface of the system, a request for first content to one or more remote computing devices associated with a media content service (MCS); and receiving, from the one or more remote computing devices associated with the MCS, the first content to be played back via the playback device.

8. A method performed by a system, the method comprising:
capturing audio input via one or more microphones of the system;
monitoring, via a first wake-word detector of the system, the captured audio input for a first wake word associated with a first voice assistant service (VAS);
monitoring, via a second wake-word detector of the system, the captured audio input for a second wake word associated with a second VAS different from the first VAS;
detecting, via the first wake-word detector, the first wake word in the captured audio input;
after detecting the first wake word, obtaining, based on the captured audio input, first content to be played back via a playback device;
playing back, via the playback device, the first content;
while playing back the first content, detecting, via the second wake-word detector, the second wake word in the captured audio input;
after detecting the second wake word:
suspending operation of the first wake-word detector;
obtaining, based on the captured audio input, second content to be played back via the playback device; and
suppressing playback of the first content;
while the playback of the first content is suppressed, playing back, via the playback device, the second content; and
after playing back the second content:
resuming playback of the first content; and
resuming monitoring the captured audio input for the first wake word.

9. The method of claim 8, further comprising:
determining a content type associated with the first content; and
based at least in part on the content type and on an identity of the second VAS, suspending operation of the first wake-word detector while playing back the second content.

10. The method of claim 8, wherein the first content comprises at least one of: a text-to-speech output from the first VAS, an alarm, or a timer.

11. The method of claim 8, wherein suspending operation of the first wake-word detector comprises powering down the first wake-word detector to a low-power or no-power state.

12. The method of claim 8, wherein suppressing playback of the first content comprises one of:
ducking the first content while playing back the second content; or
interrupting the first content while playing back the second content.

13. The method of claim 8, wherein obtaining, based on the captured audio input, first content to be played back via the playback device comprises:
after detecting the second wake word, transmitting, via a network interface of the system, a voice utterance of the captured audio input to one or more remote computing devices associated with the first VAS; and
receiving, from the one or more remote computing devices associated with the first VAS, the first content to be played back via the playback device.

14. The method of claim 8, wherein obtaining, based on the captured audio input, first content to be played back via the playback device comprises:
after detecting the first wake word, transmitting, via a network interface of the system, a request for first content to one or more remote computing devices associated with a media content service (MCS); and
receiving, from the one or more remote computing devices associated with the MCS, the first content to be played back via the playback device.

15. At least one tangible, non-transitory computer readable medium storing instructions that, when executed by one or more processors of a system, cause the system to perform operations comprising:
capturing audio input via one or more microphones of the system;
monitoring, via a first wake-word detector of the system, the captured audio input for a first wake word associated with a first voice assistant service (VAS);
monitoring, via a second wake-word detector of the system, the captured audio input for a second wake word associated with a second VAS different from the first VAS;
detecting, via the first wake-word detector, the first wake word in the captured audio input;
after detecting the first wake word, obtaining, based on the captured audio input, first content to be played back via a playback device;
playing back, via the playback device, the first content;
while playing back the first content, detecting, via the second wake-word detector, the second wake word in the captured audio input;
after detecting the second wake word:
suspending operation of the first wake-word detector;
obtaining, based on the captured audio input, second content to be played back via the playback device; and
suppressing playback of the first content;
while the playback of the first content is suppressed, playing back, via the playback device, the second content;
after playing back the second content:
resuming playback of the first content; and
resuming monitoring the captured audio input for the first wake word.

16. The computer-readable medium of claim 15, wherein the operations further comprise:
determining a content type associated with the first content; and
based at least in part on the content type and on an identity of the second VAS, suspending operation of the first wake-word detector while playing back the second content.

17. The computer-readable medium of claim 15, wherein suspending operation of the first wake-word detector comprises powering down the first wake-word detector to a low-power or no-power state.

18. The computer-readable medium of claim 15, wherein suppressing playback of the first content comprises one of:
ducking the first content while playing back the second content; or
interrupting the first content while playing back the second content.

19. The computer-readable medium of claim 15, wherein obtaining, based on the captured audio input, first content to be played back via the playback device comprises:

after detecting the second wake word, transmitting, via a network interface of the system, a voice utterance of the captured audio input to one or more remote computing devices associated with the first VAS; and receiving, from the one or more remote computing devices associated with the first VAS, the first content to be played back via the playback device.

20. The computer-readable medium of claim 15, wherein obtaining, based on the captured audio input, first content to be played back via the playback device comprises:

after detecting the first wake word, transmitting, via a network interface of the system, a request for first content to one or more remote computing devices associated with a media content service (MCS); and receiving, from the one or more remote computing devices associated with the MCS, the first content to be played back via the playback device.

* * * * *

UNITED STATES PATENT AND TRADEMARK OFFICE
CERTIFICATE OF CORRECTION

| | | |
|---|---|---|
| PATENT NO. | : 11,881,223 B2 | |
| APPLICATION NO. | : 18/061579 | |
| DATED | : January 23, 2024 | |
| INVENTOR(S) | : Myers et al. | |

It is certified that error appears in the above-identified patent and that said Letters Patent is hereby corrected as shown below:

In the Claims

In Column 36, in Claim 15, Line 42, after "content;" insert -- and --.

Signed and Sealed this
Tenth Day of September, 2024

*Katherine Kelly Vidal*

Katherine Kelly Vidal
*Director of the United States Patent and Trademark Office*